(12) United States Patent
Tsukuba

(10) Patent No.: US 12,177,439 B2
(45) Date of Patent: Dec. 24, 2024

(54) IMAGE PROCESSING DEVICE AND IMAGE PROCESSING METHOD FOR EFFICIENTLY GENERATING OR SIGNALING QUANTIZING MATRICES

(71) Applicant: Sony Group Corporation, Tokyo (JP)

(72) Inventor: Takeshi Tsukuba, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 235 days.

(21) Appl. No.: 17/859,469

(22) Filed: Jul. 7, 2022

(65) Prior Publication Data

US 2022/0345708 A1 Oct. 27, 2022

Related U.S. Application Data

(63) Continuation of application No. 16/980,422, filed as application No. PCT/JP2019/009177 on Mar. 7, 2019, now abandoned.

(30) Foreign Application Priority Data

Mar. 28, 2018 (JP) ................................. 2018-062704

(51) Int. Cl.
*H04N 19/126* (2014.01)
*H04N 19/132* (2014.01)
(Continued)

(52) U.S. Cl.
CPC ......... *H04N 19/126* (2014.11); *H04N 19/132* (2014.11); *H04N 19/176* (2014.11);
(Continued)

(58) Field of Classification Search
CPC ............... H04N 19/463; H04N 19/126; H04N 19/132
See application file for complete search history.

(56) References Cited

U.S. PATENT DOCUMENTS

| 9,955,160 B1 * | 4/2018 | Yadav | .................. H04N 19/154 |
| 2009/0028239 A1 * | 1/2009 | Schuur | .................. H04N 19/88 |
| | | | 375/240.03 |

(Continued)

FOREIGN PATENT DOCUMENTS

| CA | 2622842 A1 * | 8/2009 | ........... H04N 19/122 |
| CN | 1977540 A | 6/2007 | |

(Continued)

OTHER PUBLICATIONS

International Search Report and Written Opinion mailed on May 28, 2019 for PCT/JP2019/009177 filed on Mar. 7, 2019, 11 pages including English Translation of the International Search Report.

(Continued)

*Primary Examiner* — Zhubing Ren
(74) *Attorney, Agent, or Firm* — XSENSUS LLP

(57) ABSTRACT

An image processing device is provided. The image processing device includes a decoding unit that decodes scaling list data to generate a first quantizing matrix of a first size, a generating unit that generates a second quantizing matrix for a transform block of a second size to which zeroing of a high-frequency component is applied, by referring to only a partial matrix of the first quantizing matrix generated by the decoding unit, and an inverse quantizing unit that inversely quantizes a quantized transform coefficient of the transform block of the second size, using the second quantizing matrix generated by the generating unit.

20 Claims, 21 Drawing Sheets

(51) Int. Cl.
*H04N 19/176* (2014.01)
*H04N 19/18* (2014.01)
*H04N 19/463* (2014.01)
*H04N 19/61* (2014.01)
*H04N 19/96* (2014.01)
*H04N 19/70* (2014.01)

(52) U.S. Cl.
CPC ........... *H04N 19/18* (2014.11); *H04N 19/463* (2014.11); *H04N 19/61* (2014.11); *H04N 19/96* (2014.11); *H04N 19/70* (2014.11)

(56) References Cited

U.S. PATENT DOCUMENTS

| | | | |
|---|---|---|---|
| 2013/0216149 A1* | 8/2013 | Sato | H04N 19/463 382/248 |
| 2014/0192862 A1* | 7/2014 | Flynn | H04N 19/117 375/240.03 |
| 2015/0264403 A1 | 9/2015 | Chong | |
| 2016/0021373 A1 | 1/2016 | Queru | |
| 2016/0088302 A1* | 3/2016 | Zheng | H04N 19/46 375/240.03 |
| 2016/0212429 A1* | 7/2016 | Ichigaya | H04N 19/126 |
| 2016/0316203 A1 | 10/2016 | Yadav | |
| 2019/0215516 A1 | 7/2019 | Lim et al. | |

FOREIGN PATENT DOCUMENTS

| | | |
|---|---|---|
| CN | 103535037 A | 1/2014 |
| CN | 105580368 A | 5/2016 |
| CN | 106663209 A | 5/2017 |
| JP | 2000-236547 A | 8/2000 |
| JP | 2013-543317 A | 11/2013 |
| JP | 2015-504289 A | 2/2015 |
| JP | 2017-513342 A | 5/2017 |
| WO | 2012/077408 A1 | 6/2012 |
| WO | 2012/160890 A1 | 11/2012 |
| WO | 2016/044842 A1 | 3/2016 |
| WO | 2018/008387 A1 | 1/2018 |

OTHER PUBLICATIONS

Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, JVET-G1001-v1, 7th Meeting, Torino, IT, Jul. 13-21, 2017, 50 pages.

Chen, J., et al., "Coding tools investigation for next generation video coding," Study Group 16—Contribution 806, ITU-T, Jan. 2015, pp. 1-2.

Sole, J. et al., "Reduced complexity 32x32 transform by coefficient zero-out," Joint Collaborative Team on Video Coding (JCT-VC) of ITU-T SG16 WP3 and ISO/IEC JTC1/SC29/WG11 3rd Meeting, JCTVC-C237, WG11 No. m18278, Guangzhou, CN, Oct. 7-15, 2010, pp. 1-4.

Recommendation ITU-T H.264 (Apr. 2017) "Advanced video coding for generic audiovisual services", Apr. 2017.

Recommendation ITU-T H.265 (Dec. 2016) "High efficiency video coding", Dec. 2016.

Long-Wen Chang , Ching-Yang Wang and Shiuh-Ming Lee , "Designing JPEG quantization tables based on human visual system", International Conference on Image Processing, ICIP 99, Oct. 24-28, 1999.

* cited by examiner

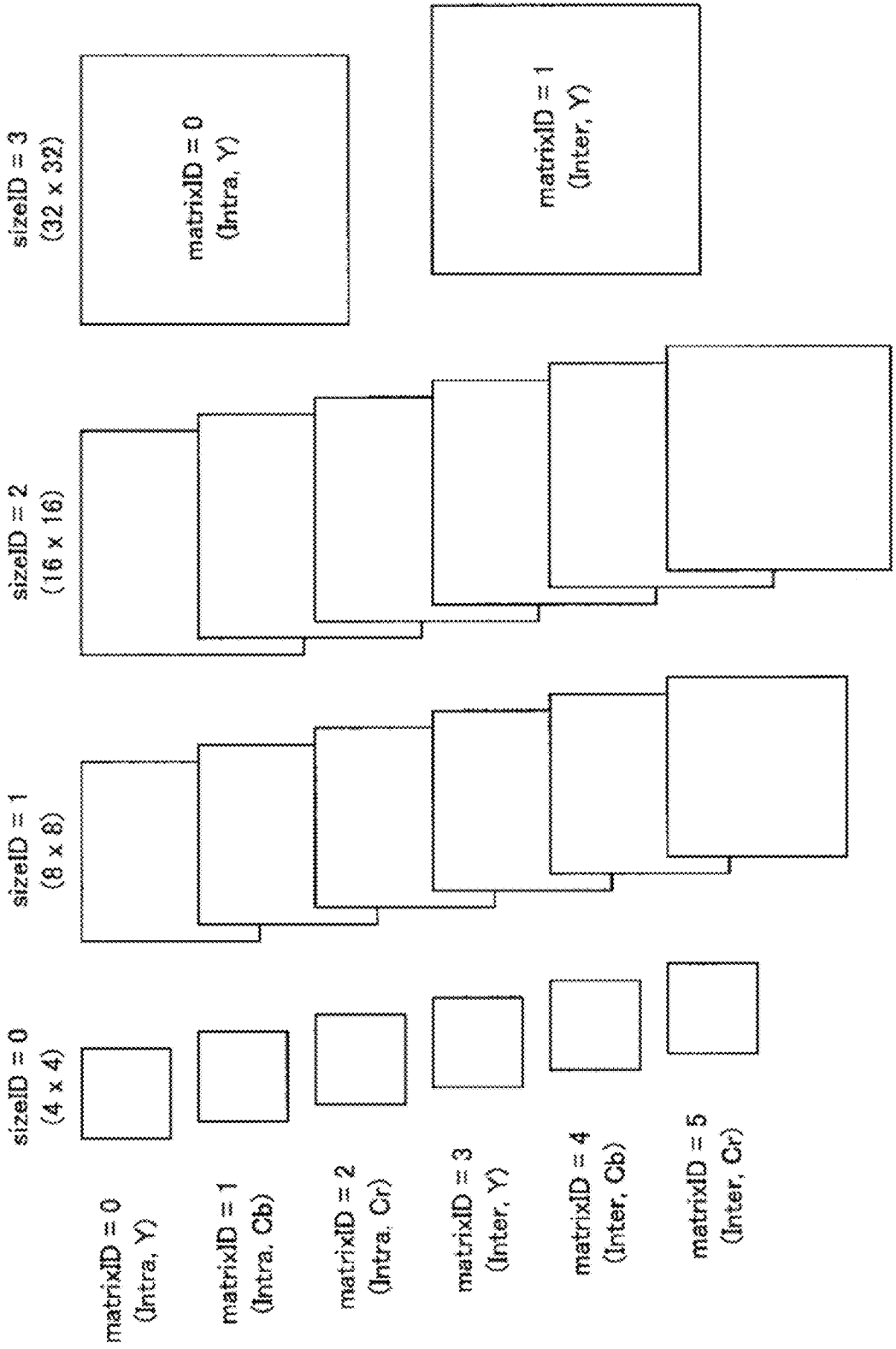

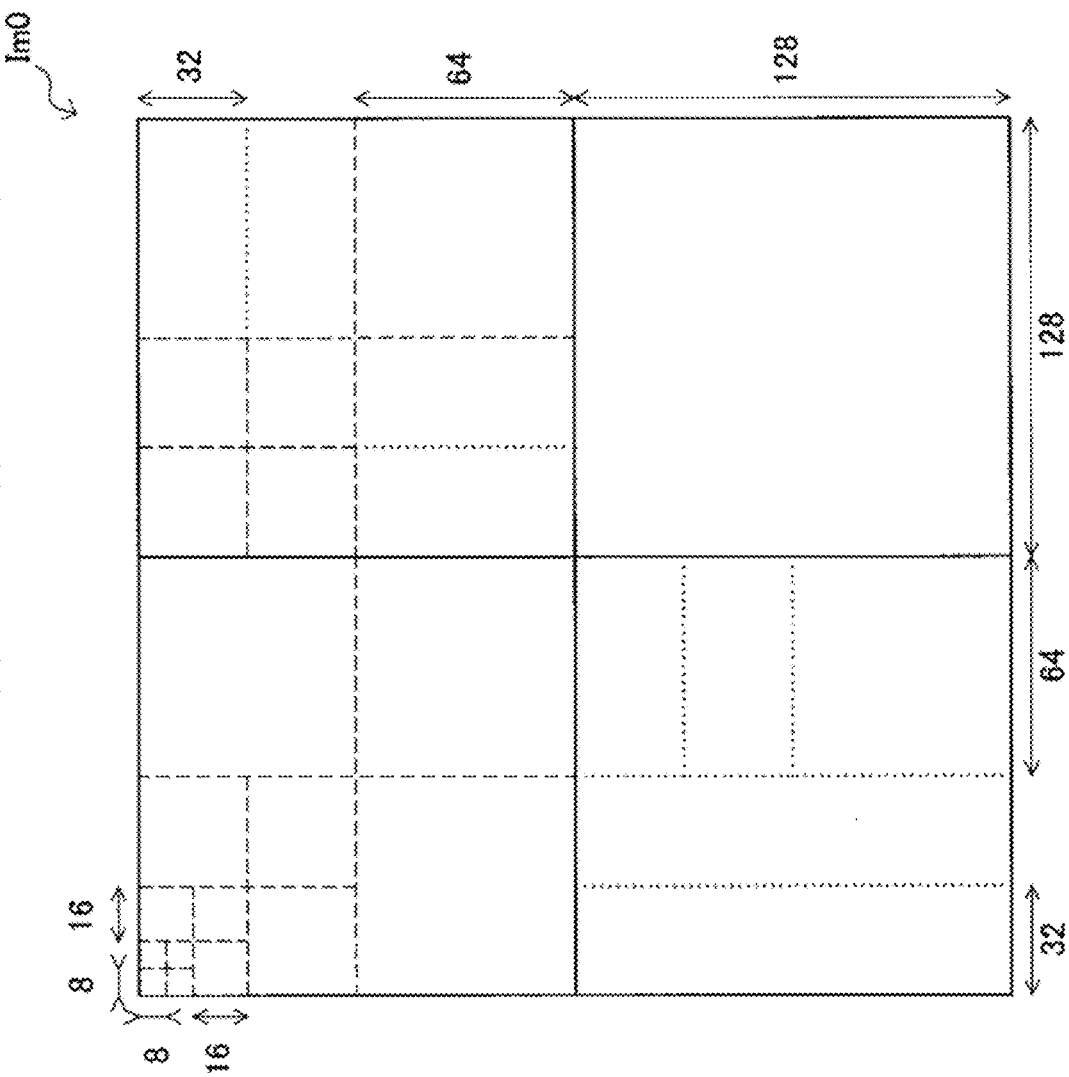

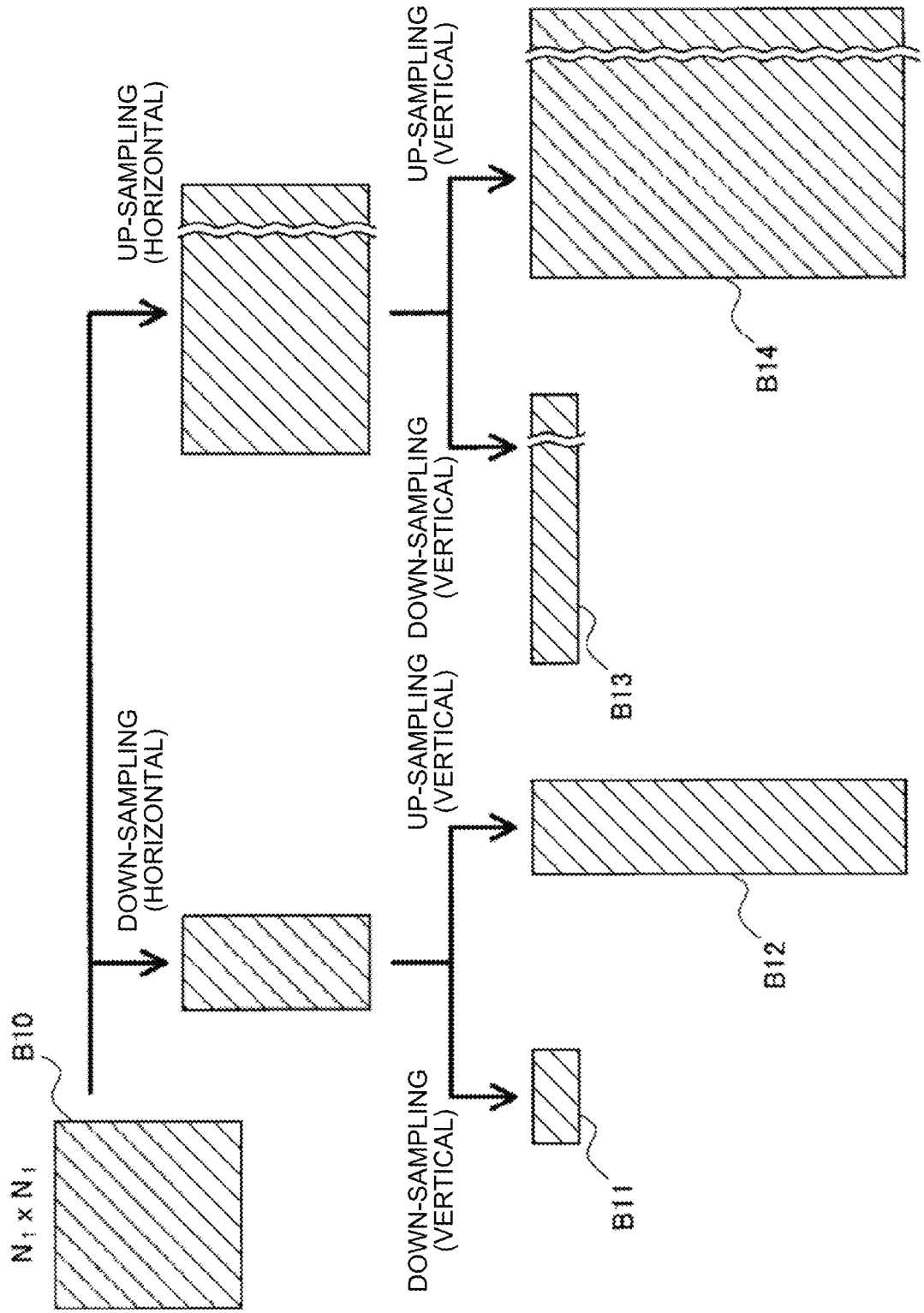

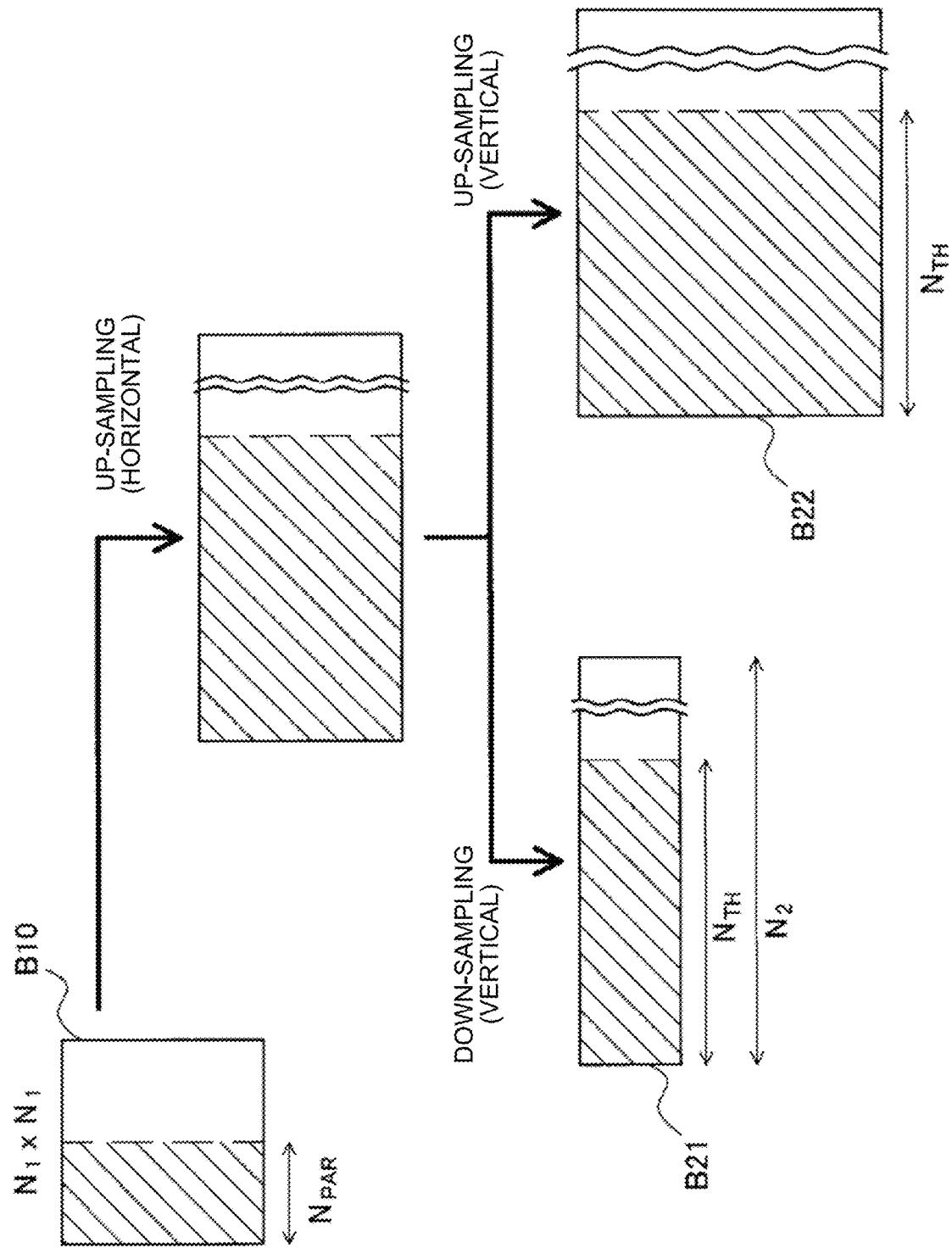

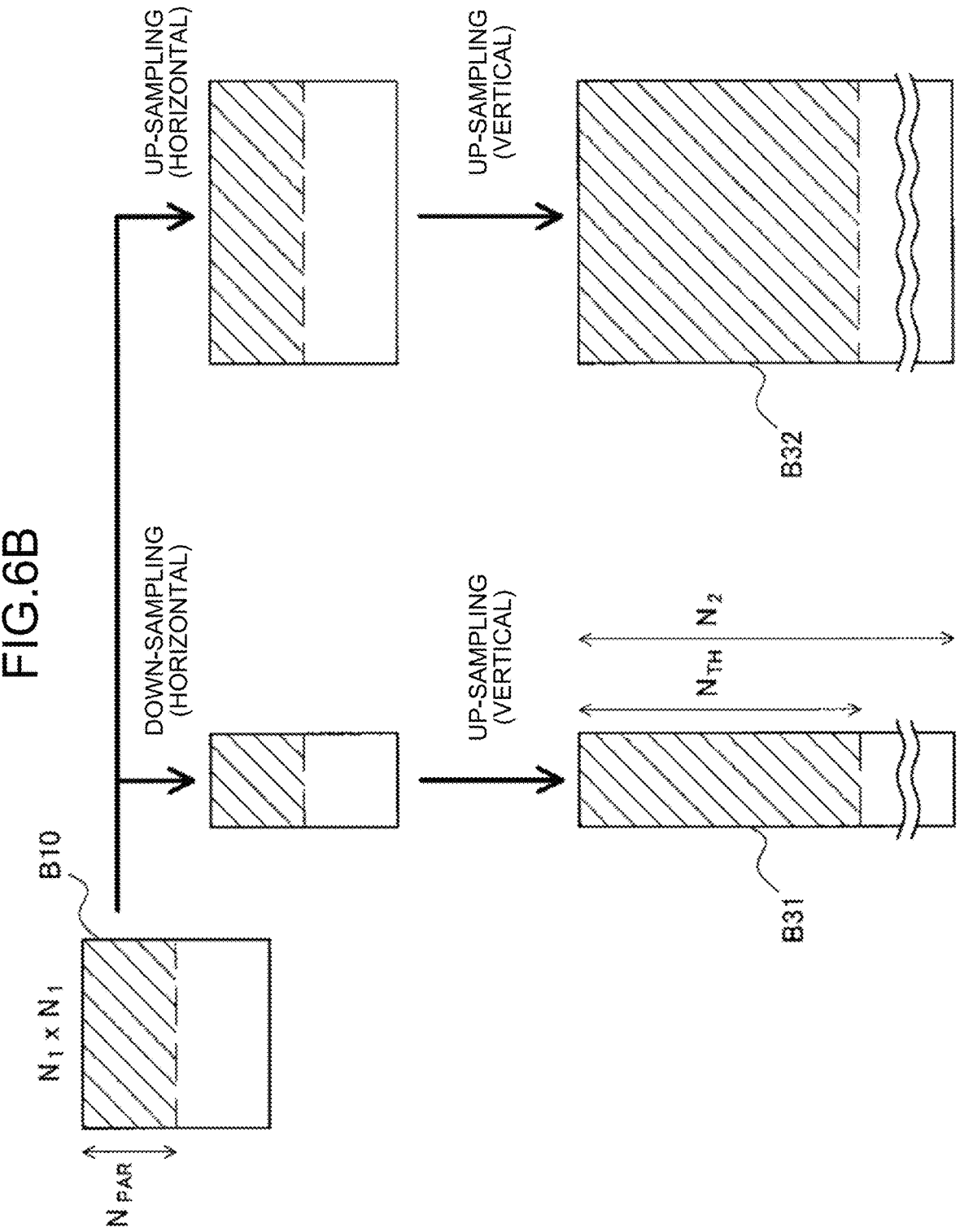

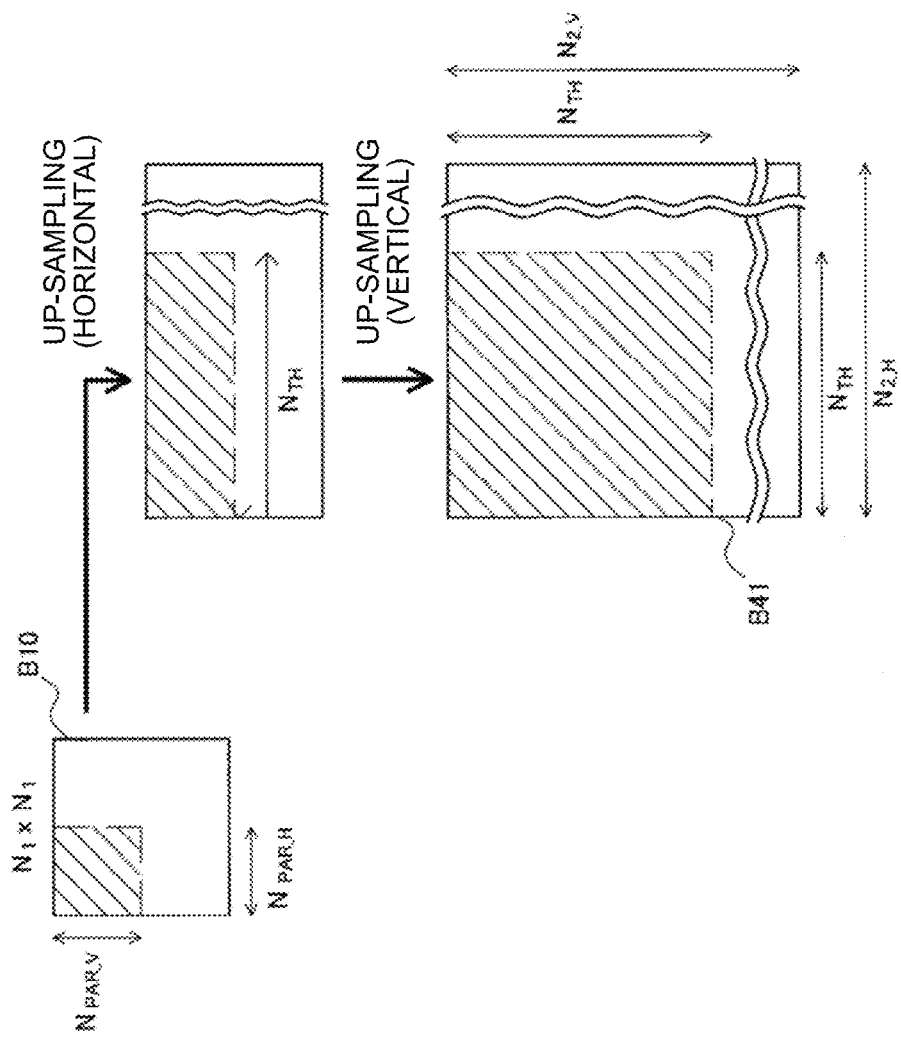

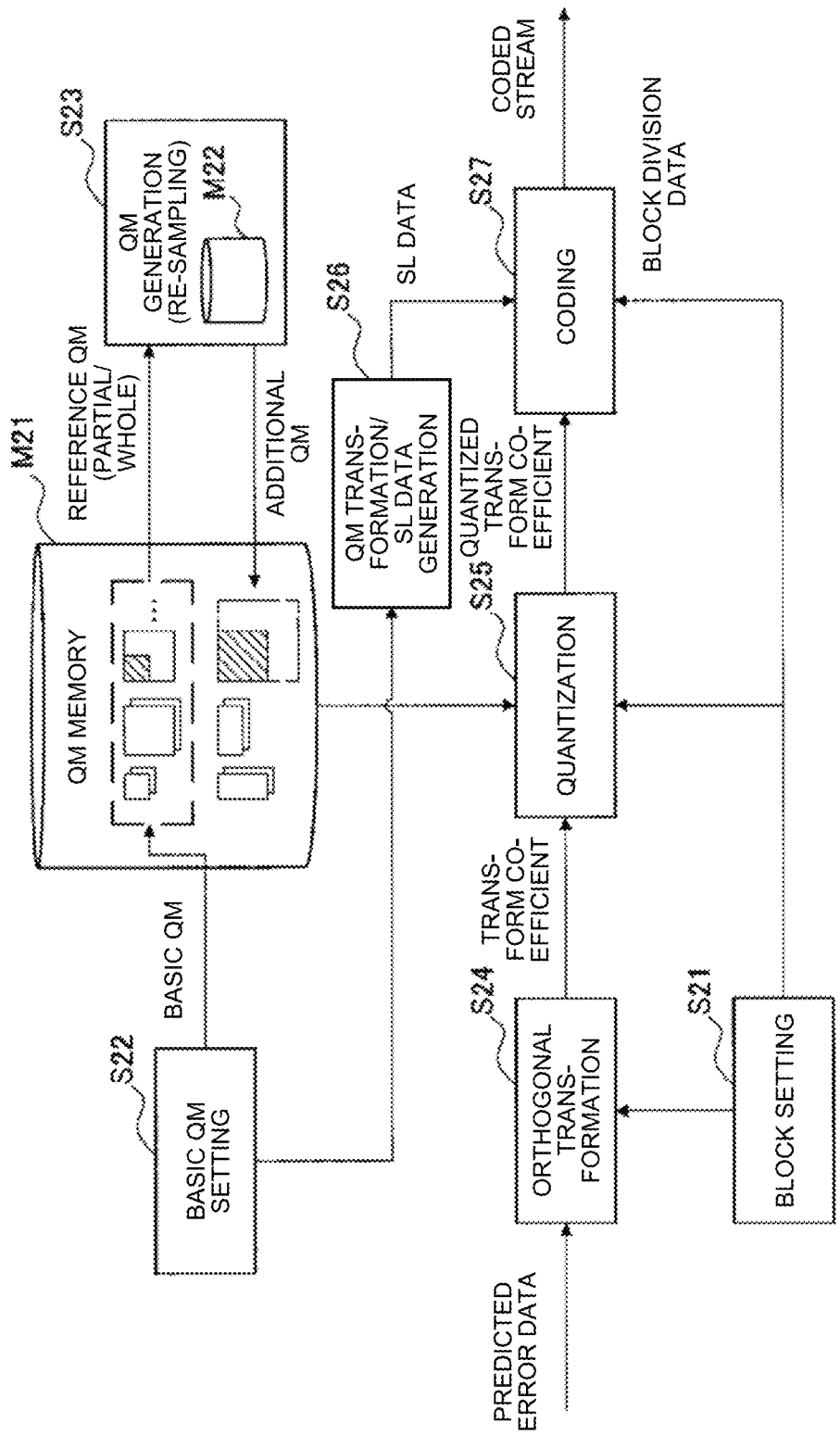

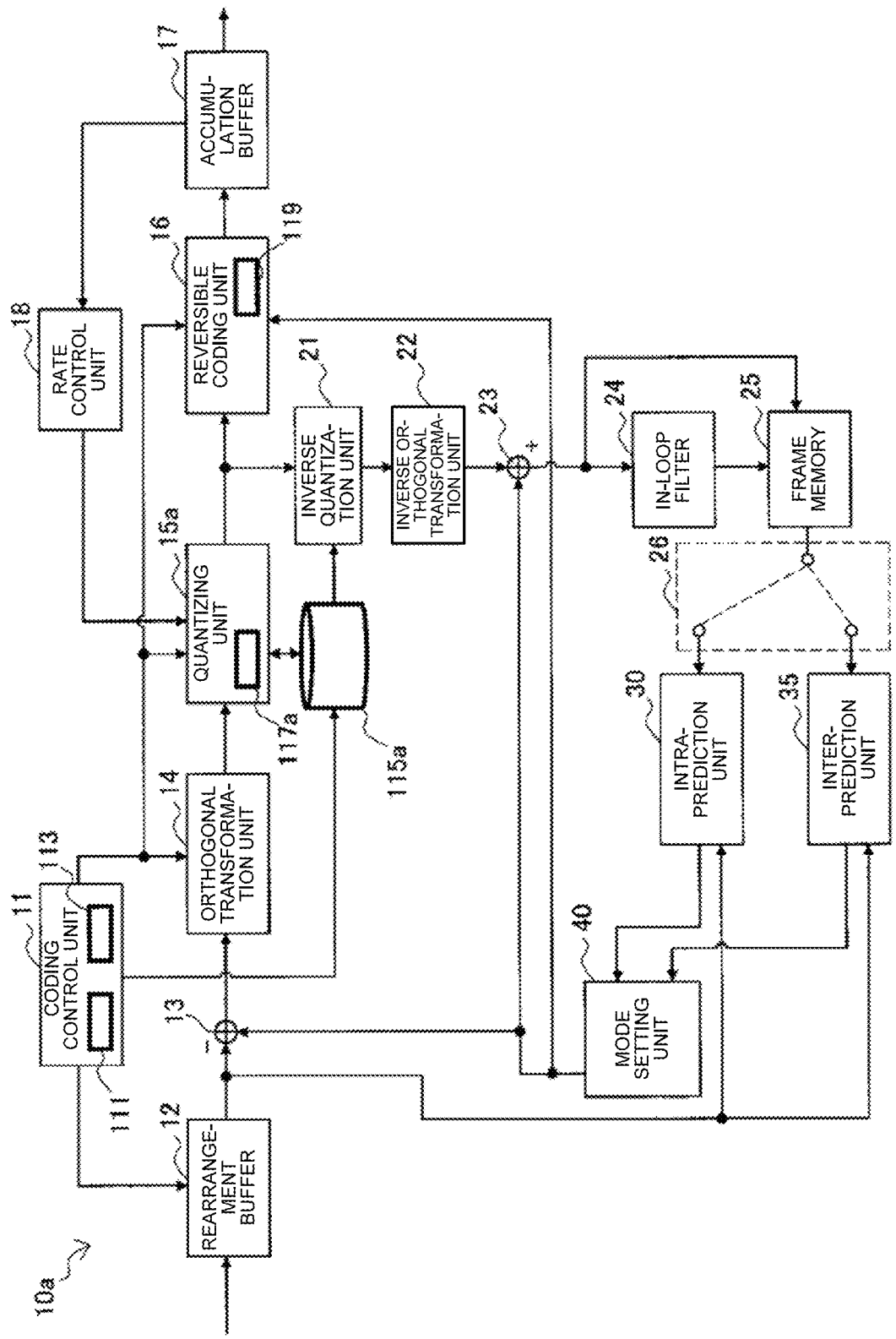

IMAGE PROCESSING DEVICE AND IMAGE PROCESSING METHOD FOR EFFICIENTLY GENERATING OR SIGNALING QUANTIZING MATRICES

CROSS-REFERENCE TO RELATED APPLICATIONS

The present application is a continuation of U.S. application Ser. No. 16/980,422, filed Sep. 14, 2020, which is based on PCT filing PCT/JP2019/009177, filed Mar. 7, 2019, which claims priority to JP 2018-062704, filed Mar. 28, 2018, the entire contents of each are incorporated herein by reference.

FIELD

The present disclosure relates to an image processing device and an image processing method.

BACKGROUND

Conventionally, many video coding methods, such as H.264/AVC and H.265/HEVC, which is said to be capable of achieving coding (compression) efficiency about two times the coding efficiency of H.264/AVC, have been standardized for the purpose of efficiently transmitting, storing, or recording digital images. Joint Video Experts Team (JVET), a standardizing body jointly set up by ITU-T and ISO/IEC, has started discussing standardization of future video coding (FVC), a next-generation video coding method, aiming at a further improved coding efficiency that is better than the coding efficiency of H.265/HEVC. FVC reference software, which is being developed based on an HEVC model, is referred to as joint exploration model (JEM), and various technical elements incorporated in JEM are described in non-patent literature 1.

Existing video coding methods involve various techniques, such as prediction (intra-prediction/inter-prediction), orthogonal transformation, quantization, and entropy coding. A quantization process, which is one of the above techniques, quantizes high-frequency components of transform coefficients more roughly than quantization of low-frequency components in the frequency domain after orthogonal transformation. This achieves an intended data rate while suppressing a deterioration in subjective image quality. According to H.265/HEVC (which will hereinafter be referred to simply as "HEVC"), orthogonal transformation and quantization are executed for each block called transform unit (TU). Candidates for TU sizes include 4×4, 8×8, 16×16, and 32×32, and quantizing matrices corresponding to some TU sizes can be signaled from an encoder to a decoder. A quantizing matrix affects quantizing steps of quantizing respective frequency components of transform coefficients of each block. FVC allows an expanded maximum TU size of 128×128 and allows also a non-square TU.

The more TU sizes are, the more the diversity of quantizing matrices used becomes. However, signaling all of these quantizing matrices increases overhead in a coded bit stream, thus lowering coding efficiency. To solve this problem, patent literatures 1 and 2 propose a technique by which not the entire quantizing matrices used but only some of them are signaled and the rest of the quantizing matrices are generated from the signaled quantizing matrices so that an increase in overhead is avoided.

CITATION LIST

Non Patent Literature

Non Patent Literature 1: J. Chen, E. Alshina, G. J. Sullivan, J. R. Ohm and J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

PATENT LITERATURE

Patent Literature 1: WO 2012/077408 A
Patent Literature 2: WO 2012/160890 A

SUMMARY

Technical Problem

A drop in coding efficiency caused by signaling of quantizing matrices and an effect that generation of a different quantizing matrix from a certain quantizing matrix has on device performance have a relationship of trading off against each other. Particularly, in the case of FVC where combinations of block sizes and shapes vary significantly, not only the coding efficiency but also process cost required for generation of quantizing matrices (e.g., occupation of hardware resources, processing delays, increasing power consumption, etc.) is a factor that cannot be neglected.

It is therefore desirable that an improved system for efficiently generating or signaling quantizing matrices be provided.

Solution to Problem

According to the disclosure, an image processing device is provided. The image processing device includes a decoding unit that decodes scaling list data to generate a first quantizing matrix of a first size, a generating unit that generates a second quantizing matrix for a transform block of a second size to which zeroing of a high-frequency component is applied, by referring to only a partial matrix of the first quantizing matrix generated by the decoding unit, and an inverse quantizing unit that inversely quantizes a quantized transform coefficient of the transform block of the second size, using the second quantizing matrix generated by the generating unit.

Moreover, according to the disclosure, an image processing method executed by an image processing device is provided. The image processing method includes decoding scaling list data to generate a first quantizing matrix of a first size, generating a second quantizing matrix for a transform block of a second size to which zeroing of a high-frequency component is applied, by referring to only a partial matrix of the first quantizing matrix generated, and inversely quantizing a quantized transform coefficient of the transform block of the second size, using the second quantizing matrix generated.

Moreover, according to the disclosure, an image processing device is provided. The image processing device includes a generating unit that generates a second quantizing matrix for a transform block of a second size to which zeroing of a high-frequency component is applied, by referring to only a partial matrix of a first quantizing matrix of a first size, a quantizing unit that quantizes a transform coefficient of the transform block of the second size in an image to be coded, using the second quantizing matrix generated by the generating unit, to generate a quantized transform coefficient, and a coding unit that codes a scaling list expressing the quantized transform coefficient and the first quantizing matrix, to generate a coded stream.

Moreover, according to the disclosure, an image processing method executed by an image processing device is provided. The image processing method includes generating a second quantizing matrix for a transform block of a second size to which zeroing of a high-frequency component is applied, by referring to only a partial matrix of a first quantizing matrix of a first size, quantizing a transform coefficient of the transform block of the second size in an image to be coded, using the second quantizing matrix generated, to generate a quantized transform coefficient, and coding a scaling list expressing the quantized transform coefficient and the first quantizing matrix, to generate a coded stream.

Advantageous Effects of Invention

According to the technique of the present disclosure, quantizing matrices can be generated or signaled efficiently.

Note that the foregoing advantageous effects are not necessarily restrictive and that any of the advantageous effects disclosed in the present specification or other advantageous effects which may be understood from the present specification may also be offered in addition to or in place of the foregoing advantageous effects.

BRIEF DESCRIPTION OF DRAWINGS

FIG. 1 is an explanatory view for explaining types of quantizing matrices usable in HEVC.

FIG. 2 is an explanatory view illustrating an example of QTBT block division in FVC.

FIG. 5 is an explanatory diagram for explaining generation of a quantizing matrix for a transform bock to which zeroing is not applied.

FIG. 6A is a first explanatory diagram for explaining generation of a quantizing matrix for a transform bock to which zeroing is applied.

FIG. 6B is a second explanatory diagram for explaining generation of a quantizing matrix for a transform bock to which zeroing is applied.

FIG. 6C is a third explanatory diagram for explaining generation of a quantized matrix for a transform bock to which zeroing is applied.

FIG. 7 is an explanatory diagram for explaining an example of basic implementation of the technique according to the present disclosure on an encoder side.

FIG. 8 is a block diagram illustrating an example of a configuration of an encoder according to a first embodiment.

DESCRIPTION OF EMBODIMENTS

Figure 3A:
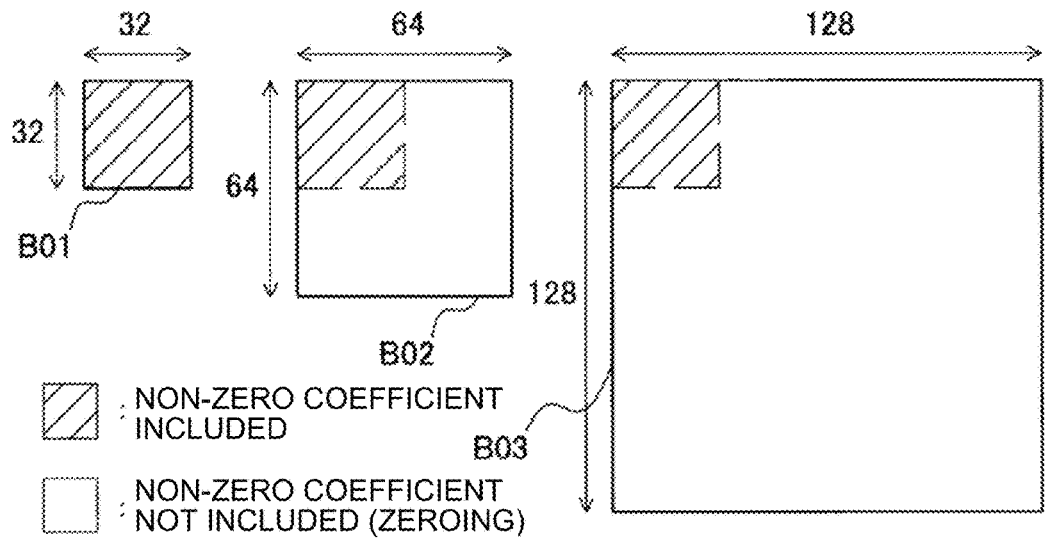
FIG. 3A is an explanatory view for explaining zeroing of transform coefficients of a square transform block in FVC.

Hereinafter, preferred embodiments of the present disclosure will be described in detail with reference to the accompanying drawings. Note that in the present specification and drawings, components having substantially the same functional configuration will be denoted by the same reference signs, and a redundant description thereof will be omitted.

The scope of the present disclosure is not limited to the contents of the following detailed description, and the contents of reference documents REF1 to REF3, which were known to the public at the time of filing the present disclosure, are also included in the scope as reference materials. In other words, the contents of these reference documents also provide grounds for determining whether a support requirement is satisfied. For example, a quad-tree block structure described in the reference document REF2 and a quad tree plus binary tree (QTBT) block structure described in the reference document REF3 are included in the scope of the present disclosure unless these block structures' being out of the scope is clearly stated separately. Similarly, such technical terms as "parsing", "syntax", and "semantics" are also included in the scope of the present disclosure, regardless of whether direct references are made to the terms in the following detailed description, and the support requirement regarding these terms, which may be used in Claims, are satisfied.

REF1: Recommendation ITU-T H.264 (April 2017) "Advanced video coding for generic audiovisual services", April 2017

REF2: Recommendation ITU-T H.265 (December 2016) "High efficiency video coding", December 2016

REF3: J. Chen, E. Alshina, G. J. Sullivan, J. R. Ohm and J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

Description will hereinafter be made in the following order in which titles and sub-titles are arranged.
1. Overview
1-1. Definition of Terms
1-2. Existing Techniques and Their Problems
1-3. Principle of Technique According to the Present Disclosure
1-4. Controlling Zeroing
1-5. Controlling Size of Basic Quantizing Matrix
2. First Embodiment
2-1. Configuration of Encoder
2-2. Examples of Syntax and Semantics
2-3. Selecting Reference Quantizing Matrix
2-4. Re-sampling Method
2-5. Flow of Quantization-Related Processes Executed at Coding
2-6. Configuration of Decoder
2-7. Flow of Inverse-Quantization-Related Processes Executed at Decoding
3. Second Embodiment
3-1. Configuration of Encoder
3-2. Flow of Quantization-Related Processes Executed at Coding
3-3. Configuration of Decoder
3-4. Flow of Inverse-Quantization-Related Processes Executed at Decoding
4. Hardware Configuration Example
5. Conclusion

1. OVERVIEW

1-1. Definition of Terms

Some terms used in this specification are defined as follows.

Transform block refers to a block that is set in an image and that is treated as a process unit in orthogonal transformation and inverse orthogonal transformation. A transform block has a size of M×N, where M represents the number of components in the horizontal direction and N represents the number of components in the vertical direction (M and N each denote an integer equal to or larger than 2). The transform block is square when M=N, and is non-square when M≠N.

Transform coefficient is a coefficient for each frequency component that is derived by transforming a signal sample in the spacial domain into a signal sample in the frequency domain. Transformation from the spacial domain to the frequency domain may be performed as, for example, orthogonal transformation (or inverse orthogonal transformation), such as discrete cosine transformation (DCT) and discrete sine transformation (DST). Usually, orthogonally transforming a signal sample of a two-dimensional M×N transform block produces a two-dimensional array of the same size, i.e., two-dimensional array of M×N transform coefficients. Typically, a component on the upper left corner of the produced two-dimensional array is a direct current (DC) component, and a component located farther from the upper left corner corresponds to a higher frequency.

Quantizing matrix is a matrix that expresses quantizing steps that are used to quantize, in the frequency domain, a two-dimensional array of transform coefficients through different quantizing steps applied respectively to different components. An element of the quantizing matrix does not always need to be a quantizing step, but may be, for example, a parameter that is input to a formula for deriving a quantizing step.

Scaling list refers to a list of values that are derived by transforming elements of a quantizing matrix into one-dimensional elements by a certain scan sequence. This means that the scaling list is a kind of information indicating the quantizing matrix. Usually, in an attempt to explicitly signal a two-dimensional quantizing matrix through a coded stream, the two-dimensional quantizing matrix is transformed into a scaling list and then is coded.

1-2. Existing Techniques and their Problems (1) Signaling of a Quantizing Matrix in HEVC In HEVC, coding units (CU), which are process units in a coding process, are set in quad-tree patterns in an image. A CU for which inter-prediction is selected as a prediction type is directly divided to set one or more TUs. In a case of a CU for which intra-prediction is selected, on the other hand, each of prediction units (PU) making up the CU is divided to set one or more TUs. In HEVC, such a TU (transform unit) is equivalent to a transform block. The minimum size of the TU is 4×4, and the maximum size of the same is 32×32. An encoder and a decoder perform orthogonal transformation/quantization and inverse orthogonal transformation/inverse quantization, respectively, using such TUs as process units. In HEVC, quantizing steps may be uniform in a transform block or may be different depending on locations in the transform block (i.e., depending on frequency components of transform coefficients). For example, when coded streams run at the same bit rate, quantizing high-frequency components of transform coefficients more roughly than quantization of low-frequency components allows relative suppression of a deterioration in subjective image quality.

Quantizing steps that are different depending on locations in the transform block are expressed by elements of a quantizing matrix that is equal in size to the transform block. In HEVC, for each of TU size candidates of 4×4, 8×8, and 16×16, six (=2×3) types of quantizing matrices, which are different from each other in combination of prediction type (intra-prediction or inter-prediction) and color component (Y, Cb, or Cr), can be used. For a TU size of 32×32, two types of quantizing matrices, which are different from each other in prediction type (intra-prediction or inter-prediction), can be used. The size of a quantizing matrix is identified with a size ID, and a combination of a prediction type and a color component of the same is identified with a matrix ID. Types of quantizing matrices usable in HEVC are illustrated schematically in FIG. 1.

Further, in HEVC, existing three types of quantizing matrices are defined as follows.

An existing flat quantizing matrix of 4×4 in size that does not vary depend on the prediction type and color component An existing non-flat quantizing matrix of 8×8 in size for intra-prediction that does not vary depend on the color component An existing non-flat quantizing matrix of 8×8 in size for inter-prediction that does not vary depend on the color component An existing quantizing matrix of 16×16 in size is generated by up-sampling elements of an existing quantizing matrix of 8×8 in size by a nearest neighboring algorithm. An existing quantizing matrix of 32×32 in size is generated by up-sampling elements of an existing quantizing matrix of 16×16 in size by the same nearest neighboring algorithm. In HEVC, when using a quantizing matrix different from the existing quantizing matrices is desirable, a specific quantizing matrix defined by a user can be signaled explicitly. It should be noted, however, that while quantizing matrices of 4×4 and 8×8 in size can be signaled as a whole by scanning all of their elements, signaling of quantizing matrices of 16×16 and 32×32 in size is achieved through signaling and up-sampling of a quantizing matrix of 8×8 in size. Note that element values for DC components that make up specific quantizing matrices of 16×16 and 32×32 in size can be signaled separately.

When a quantizing matrix is signaled explicitly, elements of a two-dimensional quantizing matrix are mapped onto a scaling list, which is a one-dimensional array of elements, according to a certain scanning sequence, as described above. Then, each element of the scaling list is coded as a difference value created from each element of the quantizing matrix. The syntax of scaling list data indicative of the scaling list created in the above manner in HEVC is described in Section 7.3.4 of the reference document REF2.

(2) QTBT BLOCK STRUCTURE IN FVC

In FVC, CUs are set in a QTBT pattern in an image, and TUs and CUs are treated in common. More specifically, each of coding tree units (CTU) arranged in a lattice pattern in the image is first divided in a quad-tree pattern and, when necessary, square quad-tree leaves of various sizes are formed. Then, when necessary, each quad-tree leaf is further divided in a binary-tree pattern along either a horizontal boundary or vertical boundary. FIG. 2 illustrates an example of QTBT block division in FVC. An image Im0 illustrated in FIG. 2 includes four CTUs each having a size of 128×128. A CTU in an upper left section includes 13 CUs formed by four recursive QT divisions. Among the 13 CUs, the minimum CU is 8×8 in size and the maximum CU is 64×64 in size. A CTU in a lower left section includes five CUs formed by four recursive BT divisions. A CTU in an upper right section includes nine CUs formed by multiple times of recursive QT division and BT division. A CTU in a lower right section is not divided and therefore includes one CU. In the example of FIG. 2, the size of the minimum CU is 8×8. However, a square CU or non-square CU with the length of its one side being 2 or 4 is also permitted. In FVC, each of these CUs serves also as a transform block.

(3) ZEROING OF HIGH-FREQUENCY COMPONENTS IN FVC

Figure 3B:
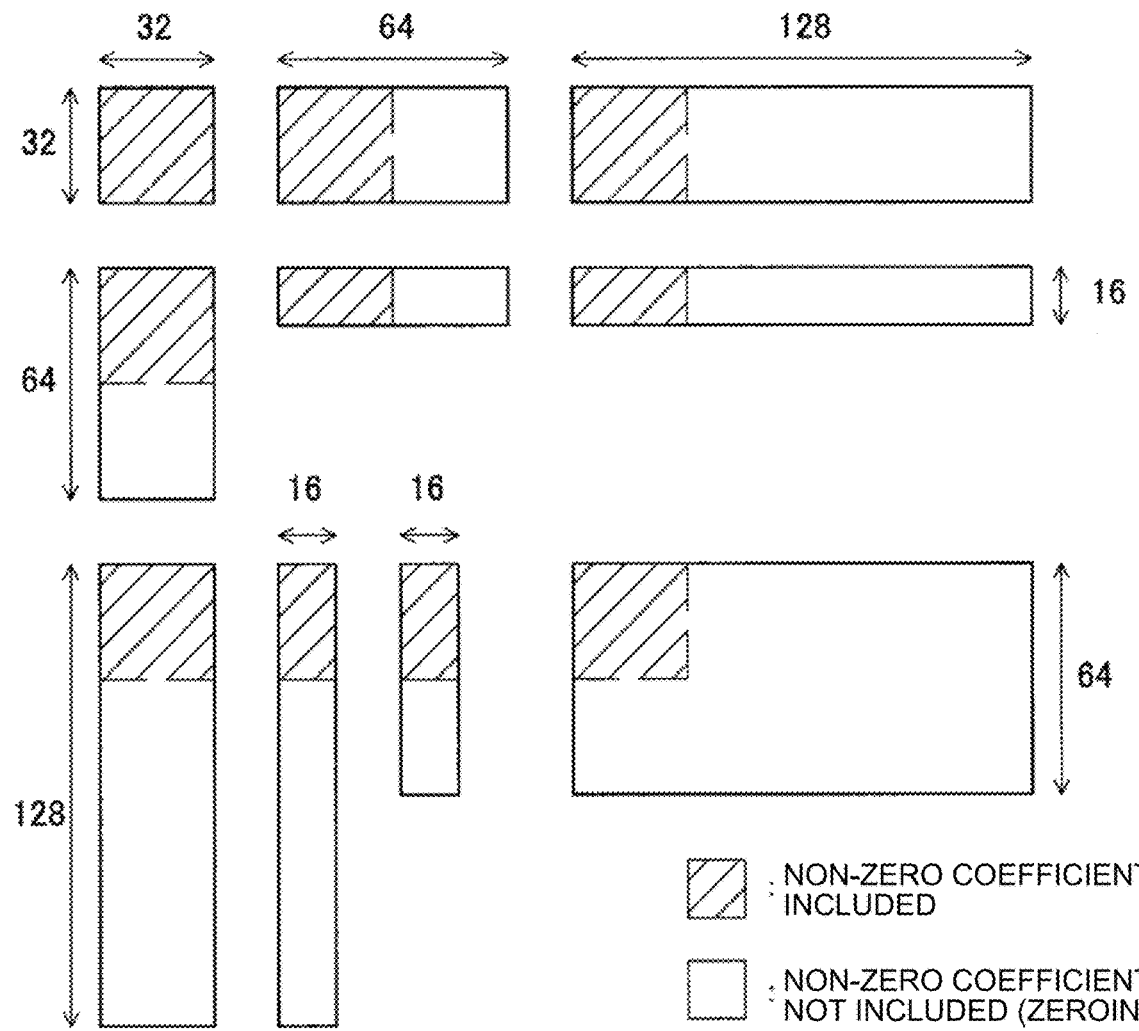
FIG. 3B is an explanatory view for explaining zeroing of transform coefficients of a non-square transform block in FVC.

As it is understood from the above description, while an upper limit of transform block sizes (i.e., TU sizes) permitted in HEVC is 32×32, an upper limit of transform block sizes permitted in FVC is 128×128, a wide increase from 32×32. Such a large transform block may be used, for example, in an application where high-definition video images called "4K" are coded efficiently. It should be noted, however, that high-frequency components of transform coefficients obtained by executing orthogonal transformation using transform blocks larger in size than 32×32 hardly contribute to subjective image quality, in spite of the large data size of the transform blocks used. For this reason, a zeroing method is adopted in FVC. According to this method, in a transform block with the length of its one side being longer than 32, the 32-th high-frequency component and other high-frequency components to follow on the high-frequency side are rendered zero (zeroing). FIGS. 3A and 3B schematically illustrate some examples of such zeroing performed in FVC.

FIG. 3A illustrates three square transform blocks B01, B02, and B03. The size of the transform block B01 is 32×32, and therefore zeroing is not applied to the transform block B01. The size of the transform block B02 is 64×64. In this case, transform coefficients of the transform block B02 except 32×32 transform coefficients in the upper left section of the transform block B02 are rendered zero. The size of the transform block B03 is 128×128. In this case, transform coefficients of the transform block B03 except 32×32 transform coefficients in the upper left section of the transform block B03 are rendered zero. FIG. 3B illustrates nine non-square transform blocks of various sizes, in addition to a square transform block of 32×32 in size. As it is understood from FIG. 3B, according to FVC, along a side of 64 or more in length, 32 frequency components on the low-frequency side are maintained as the rest of frequency components (belonging to the high-frequency side) are rendered zero.

(4) DESCRIPTION OF PROBLEMS

As described above, in HEVC, signaling of quantizing matrices of 16×16 and 32×32 in size is achieved through signaling and up-sampling of a quantizing matrix of 8×8 in size, in order to avoid a drop in coding efficiency that is caused by signaling of quantizing matrices. However, a drop in coding efficiency caused by signaling of quantizing matrices and an effect that generating a different quantizing matrix from a certain quantizing matrix (through, for example, up-sampling) has on device performance have a relationship of trading off against each other. In the case of FVC where combinations of block sizes and shapes vary significantly, in particular, trying to simply generate quantizing matrices corresponding to those combinations from other quantizing matrices results in a significant increase in process cost required for quantizing matrix generation (e.g., occupation of hardware resources, processing delays, increasing power consumption, etc.). This may lead to deteriorated performance of such devices as an encoder and a decoder.

1-3. Principle of Technique According to the Present Disclosure

To solve or at least alleviate the problems with the existing techniques described above, a technique according to the present disclosure provides an improved system for efficiently generating or signaling quantizing matrices.

(1) Example of Implementation of the Technique on a Decoder Side

Figure 4:
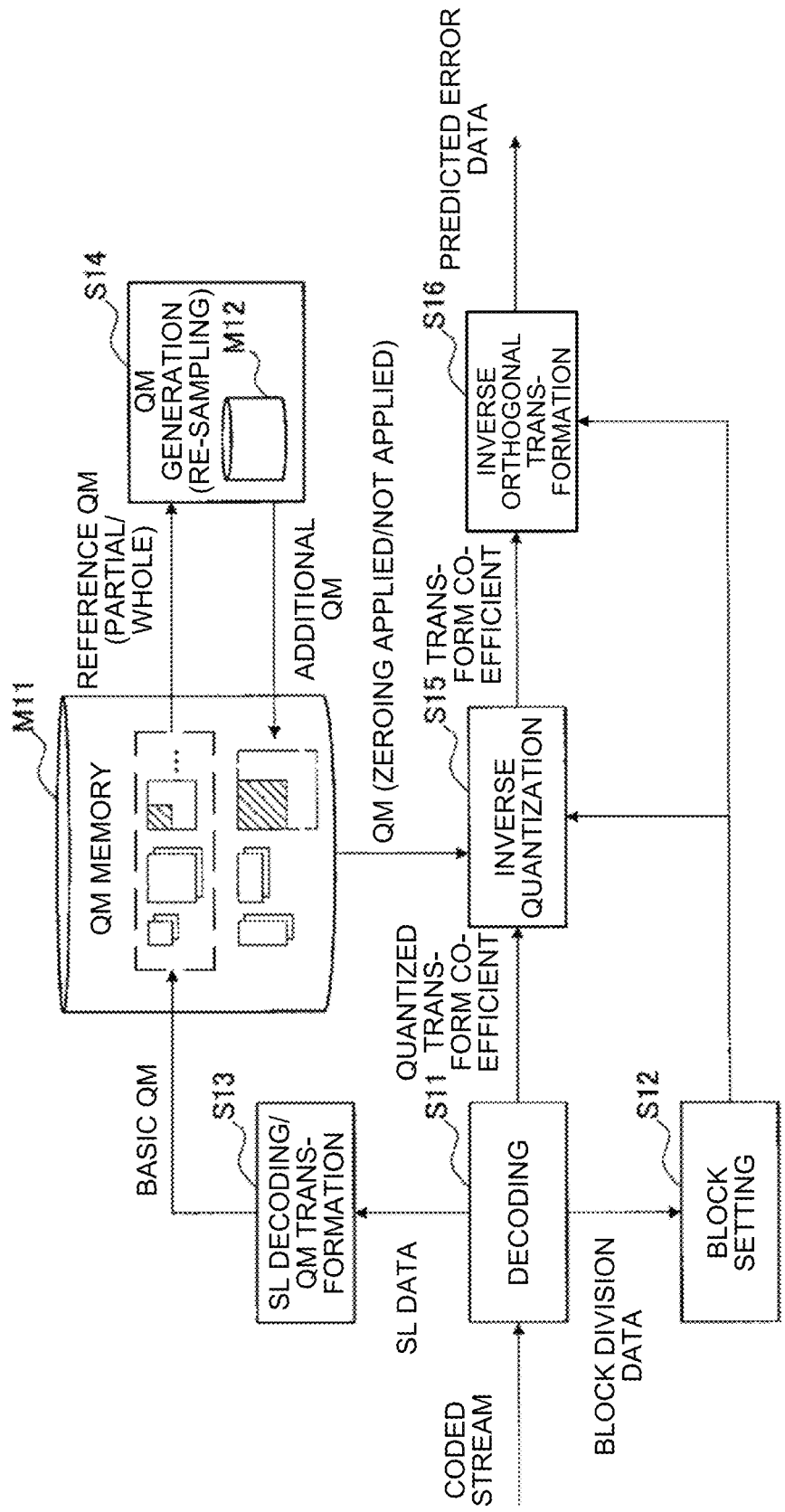
FIG. 4 is an explanatory diagram for explaining an example of basic implementation of a technique according to the present disclosure on a decoder side.

FIG. 4 is an explanatory diagram for explaining an example of basic implementation of the technique according to the present disclosure on a decoder side. FIG. 4 illustrates process steps S11 to S16 related to inverse quantization that can be executed by the decoder.

Step S11: A coded stream is decoded to parse some pieces of control data that affect inverse quantization and inverse orthogonal transformation and generate quantized transform coefficients. Control parameters include, for example, block division data that defines block division and scaling list (SL) data that defines quantizing matrices of one or more sizes.

Step S12: A plurality of transform blocks are set in a QTBT pattern in an image, based on the block division data. The block division data includes, for example, a set of parameters indicating recursive QT division or BT division of each CTU. The transform blocks set at this step may have various shapes and sizes.

Step S13: The scaling list data is decoded to generate a scaling list expressing quantizing matrices of one or more sizes, and the generated scaling list is transformed into those quantizing matrices. For each size, a plurality of types of quantizing matrices different in combination of prediction type and color component from each other may be generated. In the present specification, the quantizing matrices that are generated based on the scaling list data in the above manner (i.e., quantizing matrices that are signaled explicitly) are referred to as basic quantizing matrices (basic QM). The basic quantizing matrices generated at step S13 are stored in a QM memory M11.

Step S14: Quantizing matrices of one or more sizes other than the basic quantizing matrices are each generated by referring to one of other quantizing matrices already generated. In this manner, a quantizing matrix is additionally generated by referring to another quantizing matrix of a different size. In the present specification, such a quantizing matrix is referred to as additional quantizing matrix (additional QM). The quantizing matrix that is referred to at generation of the additional quantizing matrix is referred to as reference quantizing matrix (reference QM). Typically, the additional quantizing matrix can be generated by re-sampling the reference quantizing matrix. When the size of one side of the additional quantizing matrix is larger than the size of the corresponding side of the reference quantizing matrix, up-sampling is performed in a direction along that side. When the size of one side of the additional quantizing matrix is smaller than the size of the corresponding side of the reference quantizing matrix, in contrast, down-sampling is performed in a direction along that side. A reference memory M12 stores at least some of reference quantizing matrices that are referred to in such up-sampling and down-sampling.

As described above, in FVC, high-frequency components of a transform block with the length of its one side being larger than a certain threshold are forcibly rendered zero. When a quantizing matrix is equal in size to such a transform block to which zeroing is applied, calculating the quantizing matrix's elements corresponding to transform coefficients to be rendered zero must be unnecessary. Allocating a large volume of memory resources to calculation of those elements, therefore, would be a waste of the resources. Given this conclusion, the technique according to the present disclosure introduces a method by which when an additional quantizing matrix of a size to which zeroing is applied is generated, not the whole of a reference quantizing matrix but only the partial matrix of the same is referred to, the partial matrix covering a range that substantially contributes to quantization of non-zero coefficients. This means that an operation of calculating elements corresponding in location to coefficients to be rendered zero is skipped and that the reference memory M12 does not need to save the reference quantizing matrix's elements that are out of the range of the above partial quantizing matrix. The additional quantizing matrix generated at step S14 is stored in the QM memory M11.

Step S15: For each of the plurality of transform blocks set at step S12, quantized transform coefficients are inversely quantized to restore transform coefficients. A quantizing matrix used at this step S15 is a quantizing matrix selected from a plurality of quantizing matrices stored in the QM memory M11, the quantizing matrix corresponding to a subject transform block in combination of prediction type and color component and being equal in size to the subject transform block. A transform block to which zeroing is applied has its frequency components of some transform coefficients already rendered zero. Inverse quantization of those frequency components, therefore, may be skipped.

In an embodiment, the above step S14 is included in step S15. In this embodiment, a quantizing matrix needed for each transform block may be generated in so-called "on the fly" mode at the time of inverse quantization (if the quantizing matrix is not generated yet). In another embodiment, the above step S14 may be executed before processing on a plurality of transform blocks so that quantizing matrices of all size candidates are stored in advance in the QM memory M11.

Step S16: For each of the plurality of transform blocks set at step S12, transform coefficients in the frequency domain are subjected to inverse orthogonal transformation to restore predicted errors in the spacial domain. The predicted errors restored at this step may be synthesized with a predicted image by an additional process (not illustrated) in order to reconstruct the image.

(2) Various Samplings

The process of generating an additional quantizing matrix from a reference quantizing matrix, the process being executed at step S14 of FIG. 4, is typically a combination of down-sampling or up-sampling of elements in the horizontal direction of a quantizing matrix and down-sampling or up-sampling of elements in the vertical direction of the same. Up-sampling includes, for example, interpolating matrix elements by an interpolation method, such as a nearest neighboring algorithm, bilinear interpolation, and bicubic interpolation. Down-sampling includes, for example, thinning out matrix elements.

FIG. 5 is an explanatory diagram for explaining generation of a quantizing matrix for a transform block to which zeroing is not applied. On an upper left part of FIG. 5, a reference quantizing matrix B10 is illustrated. In this example, it is assumed for simpler description that the reference quantizing matrix B10 is of a square shape and is $N_1 \times N_1$ in size. It is also assumed that zeroing of high-frequency components is not applied to a transform block of $N_1 \times N_1$ in size.

Quantizing matrices B11, B12, B13, and B14 illustrated on a lower part of FIG. 5 are additional quantizing matrices to be generated. The size of the additional quantizing matrix B11 in the horizontal direction is smaller than $N_1$ and the size of the same in the vertical direction is also smaller than $N_1$. The additional quantizing matrix B11 corresponds to a transform block to which zeroing of high-frequency components is not applied. The additional quantizing matrix B11 is, therefore, generated by down-sampling the whole of the reference quantizing matrix B10 in both horizontal and vertical directions. The size of the additional quantizing matrix B12 in the horizontal direction is smaller than $N_1$ but the size of the same in the vertical direction is larger than $N_1$. The additional quantizing matrix B12 corresponds to a transform block to which zeroing of high-frequency components is not applied. The additional quantizing matrix B12 is, therefore, generated by down-sampling the whole of the reference quantizing matrix B10 in the horizontal direction and up-sampling the same in the vertical direction. The size of the additional quantizing matrix B13 in the horizontal direction is larger than $N_1$ but the size of the same in the vertical direction is smaller than $N_1$. The additional quantizing matrix B13 corresponds to a transform block not subjected to zeroing of high-frequency components. The additional quantizing matrix B13 is, therefore, generated by up-sampling the whole of the reference quantizing matrix B10 in the horizontal direction and down-sampling the same in the vertical direction. The size of the additional quantizing matrix B14 in the horizontal direction is larger than $N_1$ and the size of the same in the vertical direction is also larger than $N_1$. The additional quantizing matrix B14 corresponds to a transform block to which zeroing of high-frequency components is not applied. The additional quantizing matrix B14 is, therefore, generated by up-sampling the whole of the reference quantizing matrix B10 in both horizontal and vertical directions. In FIG. 5, re-sampling (down-sampling or up-sampling) in the horizontal direction and re-sampling in the vertical direction are depicted as different operations. These re-sampling operations, however, may be executed integrally as a single operation.

FIGS. 6A to 6C are explanatory diagrams for explaining generation of a quantizing matrix for a transform bock to which zeroing is applied. As described above, an additional quantizing matrix for a transform bock to which zeroing is applied is generated by referring to only the partial matrix of a reference quantizing matrix. In the same manner as in the example of FIG. 5, for simpler description, it is assumed in FIGS. 6A to 6C that the square quantizing matrix B10 of $N_1 \times N_1$ in size is selected as the reference quantizing matrix.

Quantizing matrices B21 and B22 illustrated on a lower part of FIG. 6A are additional quantizing matrices to be generated. The size of the additional quantizing matrix B21 in the horizontal direction is larger than $N_{TH}$, which denotes an upper limit of sizes to which zeroing of high-frequency components is not applied, and the size of the same in the vertical direction is smaller than $N_1$. The additional quantizing matrix B21 corresponds to a transform block to which zeroing of high-frequency components is applied. The additional quantizing matrix B21 is, therefore, generated by up-sampling a partial matrix of the reference quantizing matrix B10 in the horizontal direction and down-sampling the same in the vertical direction. In the horizontal direction, a ratio of the size $N_{PAR}$ of the partial matrix to the size $N_1$ of the reference quantizing matrix B10 is equal to a ratio of the size $N_{TH}$ of a non-zero part to the size $N_2$ of the additional quantizing matrix B21. The size of the additional quantizing matrix B22 in the horizontal direction is also larger than $N_{TH}$, which denotes the upper limit of sizes to which zeroing of high-frequency components is not applied, and the size of the same in the vertical direction is larger than $N_1$ but is smaller than $N_{TH}$. The additional quantizing matrix B22 corresponds to a transform block to which zeroing of high-frequency components is applied. The additional quantizing matrix B22 is, therefore, generated by up-sampling the partial matrix of the reference quantizing matrix B10 in both horizontal and vertical directions.

Quantizing matrices B31 and B32 illustrated on a lower part of FIG. 6B are additional quantizing matrices to be generated. The size of the additional quantizing matrix B31 in the horizontal direction is smaller than $N_1$, and the size of the same in the vertical direction is larger than $N_{TH}$, which denotes the upper limit of sizes to which zeroing of high-frequency components is not applied. The additional quantizing matrix B31 corresponds to a transform block to which zeroing of high-frequency components is applied. The additional quantizing matrix B31 is, therefore, generated by down-sampling the partial matrix of the reference quantizing matrix B10 in the horizontal direction and up-sampling the same in the vertical direction. In the vertical direction, a ratio of the size $N_{EAR}$ of the partial matrix to the size $N_1$ of the reference quantizing matrix B10 is equal to a ratio of the size $N_{TH}$ of a non-zero part to the size $N_2$ of the additional quantizing matrix B31. The size of the additional quantizing matrix B32 in the horizontal direction is larger than $N_1$ but is smaller than $N_{TH}$, and the size of the same in the vertical direction is larger than $N_{TH}$, which denotes the upper limit of sizes to which zeroing of high-frequency components is not applied. The additional quantizing matrix B32 corresponds to a transform block to which zeroing of high-frequency components is applied. The additional quantizing matrix B32 is, therefore, generated by up-sampling the partial matrix of the reference quantizing matrix B10 in both horizontal and vertical directions.

A quantizing matrix B41 illustrated on a lower part of FIG. 6C is an additional quantizing matrix to be generated. The size of the additional quantizing matrix B41 in the horizontal direction is larger than $N_{TH}$, which denotes the upper limit of sizes to which zeroing of high-frequency components is not applied, and the size of the same in the vertical direction is also larger than $N_{TH}$. The additional quantizing matrix B41 corresponds to a transform block to which zeroing of high-frequency components is applied. The additional quantizing matrix B41 is, therefore, generated by up-sampling the partial matrix of the reference quantizing matrix B10 in both horizontal and vertical directions. In the horizontal direction, a ratio of the size $N_{PAR\_H}$ of the partial matrix to the size $N_1$ of the reference quantizing matrix B10 is equal to a ratio of the size $N_{TH}$ of a non-zero part to the size $N_{2\_H}$ of the additional quantizing matrix B41. In the vertical direction, a ratio of the size $N_{PAR\_V}$ of the partial matrix to the size $N_1$ of the reference quantizing matrix B10 is equal to a ratio of the size $N_{TH}$ of the non-zero part to the size $N_{2\_V}$ of the additional quantizing matrix B41.

As illustrated in the examples of FIGS. 6A to 6C, when a quantizing matrix not signaled explicitly is generated additionally, not the whole of a reference quantizing matrix but only the partial matrix thereof is referred to. This process reduces the cost of operations for re-sampling matrix elements and avoids a waste of memory resources.

(3) Example of Implementation of the Technique on an Encoder Side

FIG. 7 is an explanatory diagram for explaining an example of basic implementation of the technique according to the present disclosure on an encoder side. FIG. 7 illustrates process steps S21 to S27 related to quantization that can be executed by the encoder.

Step S21: A plurality of transform blocks are set in a QTBT pattern in an image. A block structure can be determined, for example, as a result of a preliminary image analysis or a search for an optimum block structure. In addition, a set of parameters expressing the block structure set at this step (e.g., parameters indicating recursive QT division or BT division of each CTU) are generated as block division data.

Step S22: Basic quantizing matrices of one or more sizes that are defined by the user (i.e., quantizing matrices different from existing quantizing matrices) are set. For each size, a plurality of types of quantizing matrices different in combination of prediction type and color component from each other may be set. A quantizing matrix of a certain type may be identical with a quantizing matrix of another type. The basic quantizing matrices set at step S22 are stored in a QM memory M21.

Step S23: Quantizing matrices (additional quantizing matrices) of one or more sizes other than the basic quantizing matrices are each generated by referring to one of the basic quantizing matrices. An additional quantizing matrix can be generated by re-sampling a reference quantizing matrix, as described above referring to FIGS. 5 to 6C. A reference memory M22 stores at least some of reference quantizing matrices that are referred to at generation of additional quantizing matrices. In implementation of the technique on the encoder side, when an additional quantizing matrix of a size to which zeroing is applied is generated, not the whole of a reference quantizing matrix but only the partial matrix of the same is referred to, the partial matrix covering a range that substantially contributes to quantization of non-zero coefficients, in the same manner as in the above-described implementation of the technique on the decoder side.

Step S24: For each of the plurality of transform blocks set at step S21, predicted errors in the spacial domain are orthogonally transformed to generate transform coefficients in the frequency domain.

Step S25: For each of the plurality of transform blocks set at step S21, transform coefficients are quantized to generate quantized transform coefficients. A quantizing matrix used at this step S25 is a quantizing matrix selected from a plurality of quantizing matrices stored in the QM memory M21, the quantizing matrix corresponding to a subject transform block in combination of prediction type and color component and being equal in size to the subject transform block. A transform block to which zeroing is applied has its frequency components of some transform coefficients already rendered zero. Quantization of those frequency components, therefore, may be skipped.

In an embodiment, the above step S23 is included in step S25. In this embodiment, a quantizing matrix needed for each transform block may be generated in so-called "on the fly" mode at the time of quantization (if the quantizing matrix is not generated yet). In another embodiment, the above step S23 may be executed before processing on a plurality of transform blocks so that quantizing matrices of all size candidates are stored in advance in the QM memory M21.

As it will be described later on, the encoder usually includes a local decoder, which executes inverse quantization. Although FIG. 7 does not illustrate inverse quantization executed by the local decoder, the same quantizing matrix used at step S25 may be used also in this inverse quantization.

Step S26: The basic quantizing matrices of one or more sizes set at step S22 are transformed into scaling lists, each of which is then coded to generate scaling list data.

Step S27: Control parameters, which include block division data and scaling list data, and quantized transform coefficients are coded to generate a coded stream.

1-4. Controlling Zeroing

In the previous section, the example in which zeroing of high-frequency components is applied to a transform block with the size of at least its one side being larger than the upper limit $N_{TH}$ has been mainly described. According to the reference document REF3, as specification-based static definition of the upper limit, this upper limit $N_{TH}$ used in FVC is equivalent to 32. In this case, it is unnecessary to code a control parameter indicating to which transform block zeroing is applied. However, to realize more flexible control of zeroing, for example, the following control parameters may be additionally coded.

Zeroing flag: When this flag is true, zeroing of high-frequency components is applied to a transform block associated with this flag. When the flag is false, however, zeroing of high-frequency components is not applied to a transform block associated with the flag.

Zeroing size information: This information indicates the size of the transform block to which zeroing of high-frequency component is applied. The zeroing size information may include, for example, a boundary value (threshold) equivalent to at least either an upper limit or a lower limit of sizes to which zeroing is not applied (or is applied). The zeroing size information may also include an index indicating a size to which zeroing is not applied (or is applied). The zeroing size information may be coded regardless of whether the zeroing flag is present or not or may be coded only when the zeroing flag is true.

The above control parameters for controlling zeroing may be coded, for example, for each sequence, picture, slice, tile, CTU, or transform block. In this manner, by dynamically determining application/non-application of zeroing or a size to which zeroing is applied, an image expressing even minute high-frequency components can be reproduced flexibly according to the user's needs or system requirements/constraints.

1-5. Controlling Size of Basic Quantizing Matrix

As described above, in HEVC, specific quantizing matrices of 16×16 and 32×32 in size are not signaled directly but are each generated by up-sampling a quantizing matrix of a smaller size. Specifically, HEVC has a predetermined specification-based rule providing that quantizing matrices of up to 8×8 in size be signaled directly. Meanwhile, it is known that calculating elements of the most efficient quantizing matrix of M×N in size (M and N each denote the power of 2), based on a model of the human's luminous sensitivity characteristics (see, for example, a reference document REF4 below), produces a result that a sub-set of smaller quantizing matrices make up a larger quantizing matrix. As a method of obtaining a set of optimum quantizing matrices, therefore, down-sampling a larger basic quantizing matrix to generate an additional quantizing matrix, instead of up-sampling a smaller basic quantizing matrix to generate an additional quantizing matrix, is also considered to be advantageous.

REF4: Long-Wen Chang, Ching-Yang Wang and Shiuh-Ming Lee, "Designing JPEG quantization tables based on human visual system", International Conference on Image Processing, ICIP 99, 24-28 October, 1999

In some embodiments to be described later on, size specifying information is coded, the size specifying information indicating the size of the quantizing matrix generated as a basic quantizing matrix, from scaling list data. The size specifying information thus specifies various sizes of basic quantizing matrices, thereby allowing flexible use of various types of quantizing matrices. Obviously, the technique according to the present disclosure can also be applied to a system in which, regardless of the largeness/smallness of a matrix size, the size of the quantizing matrix signaled directly is determined in advance based on specifications.

The principle of the technique according to the present disclosure, which has been described so far, may be implemented by an image processing device (encoder) that codes a series of images making up video or may be implemented by an image processing device (decoder) that decodes a coded bit stream to reconstruct video. One image processing device may have respective functionalities of both the encoder and the decoder. The image processing device may be any type of device, such as an image-capturing device, a video recorder, a reproducing device, a display device, and an information processer. Two specific embodiments of such an image processing device will hereinafter be described in detail.

2. FIRST EMBODIMENT

[2-1. Configuration of Encoder]
(1) Overall Configuration

FIG. 8 is a block diagram illustrating an example of a configuration of an image processing device 10a according to a first embodiment, the image processing device 10a having a functionality of an encoder. Referring to FIG. 8 reveals that the image processing device 10a includes a coding control unit 11, a rearrangement buffer 12, a deducting unit 13, an orthogonal transformation unit 14, a quantizing unit 15a, a reversible coding unit 16, an accumulation buffer 17, a rate control unit 18, an inverse quantizing unit 21, an inverse orthogonal transformation unit 22, an adding unit 23, an in-loop filter 24, a frame memory 25, a switch 26, an intra-prediction unit 30, an inter-prediction unit 35, a mode setting unit 40, and a QM memory unit 115a.

The coding control unit 11 controls the overall encoder functionality of the image processing device 10a, which will be described in detail below. According to this embodiment, the coding control unit 11 includes a block setting unit 111 and a basic QM setting unit 113. The block setting unit 111 is a module that executes the block setting process step S21, which has been described above referring to FIG. 7. The basic QM setting unit 113 is a module that executes the basic QM setting process step S22, which has been described above referring to FIG. 7. These modules will be described further later on.

The rearrangement buffer 12 rearranges a series of images making up video to be coded, according to a given group-of-pictures (GOP) structure. The rearrangement buffer 12 outputs rearranged images to the deducting unit 13, to the intra-prediction unit 30, and to the inter-prediction unit 35.

The deducting unit 13 calculates predicted errors, which represent a difference between the incoming image (original image) from the rearrangement buffer 12 and a predicted image, and outputs the calculated predicted errors to the orthogonal transformation unit 14.

The orthogonal transformation unit 14 executes orthogonal transformation of each of one or more transform blocks set in an image to be coded. This orthogonal transformation may be executed, for example, as discrete cosine transformation (DCT) or discrete sine transformation (DST). More specifically, the orthogonal transformation unit 14 orthogonally transforms a signal sample in the spacial domain for each transform block, the signal sample representing the incoming predicted errors from the deducting unit 13, to generate transform coefficients in the frequency domain. In addition, under control by the coding control unit 11, the orthogonal transformation unit 14 applies zeroing to high-frequency components of a transform block of a certain size to render the high-frequency components zero. For example, in a transform block with the length of its one side being larger than 32, the 32-th frequency component and other frequency components to follow on the high-frequency side may be rendered zero. The orthogonal transformation unit 14 outputs the generated transform coefficients to the quantizing unit 15a.

The quantizing unit 15a is supplied with the incoming transform coefficients from the orthogonal transformation unit 14 and with a rate control signal from the rate control unit 18, which will be described later on. For each of one or more transform blocks in the image to be coded, the quantizing unit 15a quantizes transform coefficients, using a quantizing matrix equal in size to the transform block, to generate quantized transform coefficients (which will hereinafter be referred to also as "quantized data"). Under control by the coding control unit 11, the quantizing unit 15a skips quantization of frequency components rendered zero that are included in the transform coefficients. The quantizing unit 15a then outputs the generated quantized data to the reversible coding unit 16 and to the inverse quantizing unit 21. In addition, the quantizing unit 15a switches a quantizing step, based on the rate control signal from the rate control unit 18, thereby changing a bit rate of the quantized data. According to this embodiment, the quantizing unit 15a includes a QM generating unit 117a. The QM generating unit 117a is a module that executes the QM generating process step S23, which has been described above referring to FIG. 7. The QM generating unit 117a includes a reference memory M22 not illustrated in FIG. 8. This module will be described further later on.

The reversible coding unit 16 codes the incoming quantized data from the quantizing unit 15a to generate a coded stream. The reversible coding unit 16 codes also various control parameters, which the decoder refers to, and inserts the coded parameters into the coded stream. The control parameters coded at this point include, for example, the above-mentioned block division data and scaling list (or scaling list data). The reversible coding unit 16 outputs the generated coded stream to the accumulation buffer 17. According to this embodiment, the reversible coding unit 16 includes an SL coding unit 119. The SL coding unit 119 is a module that executes the QM transformation/SL data generating process step S26, which has been described above referring to FIG. 7. This module will be described further later on.

The accumulation buffer 17 temporarily stores the incoming coded stream from the reversible coding unit 16, using a memory medium. The accumulation buffer 17 then outputs the accumulated coded stream to a transmission unit (not illustrated), which is, for example, a communication interface or an interface connecting to peripheral equipment, at a bit rate corresponding to a bandwidth in a transmission path.

The rate control unit 18 monitors a free space of the accumulation buffer 17. According to the free space of the accumulation buffer 17, the rate control unit 18 then generates a rate control signal, and outputs the generated rate control signal to the quantizing unit 15a. For example, when finding the free space of the accumulation buffer 17 to be small, the rate control unit 18 generates a rate control signal for reducing the bit rate of the quantized data. When finding the free space of the accumulation buffer 17 to be sufficiently large, the rate control unit 18 generates a rate control signal for increasing the bit rate of the quantized data.

The inverse quantizing unit 21, the inverse orthogonal transformation unit 22, and the adding unit 23 make up a local decoder. The local decoder plays a role of decoding coded data to reconstruct an image.

For each transform bock, the inverse quantizing unit 21 inversely quantizes quantized transform coefficients, using the same quantizing matrix as used by the quantizing unit 15a, to restore transform coefficients. The inverse quantizing unit 21 skips inverse quantization of frequency components forcibly rendered zero that are included in the quantized transform coefficients. The inverse quantizing unit 21 then outputs the restored transform coefficients to the inverse orthogonal transformation unit 22.

For each transform bock, the inverse orthogonal transformation unit 22 executes inverse orthogonal transformation. More specifically, for each transform block, the inverse orthogonal transformation unit 22 subjects transform coefficients in the frequency domain, the transform coefficients coming from the inverse quantizing unit 21, to inverse orthogonal transformation, thereby restoring predicted errors in the form of a signal sample in the spacial domain. The inverse orthogonal transformation unit 22 then outputs the restored predicted errors to the adding unit 23.

The adding unit 23 adds up the incoming restored predicted errors from the inverse orthogonal transformation unit 22 and an incoming predicted image from the intra-prediction unit 30 or the inter-prediction unit 35, to reconstruct a decoded image. The adding unit 23 then outputs the reconstructed decoded image to the in-loop filter 24 and to the frame memory 25.

The in-loop filter 24 is composed of a series of filters that are applied to the decoded image for the purpose of improving its quality. The in-loop filter 24 may include one or more of, for example, a bilateral filter, a de-blocking filter, an adaptive offset filter, and an adaptive loop filter, which are described in the reference document REF3. The in-loop filter 24 outputs the decoded image having been filtered through the series of filters, to the frame memory 25.

The frame memory 25 stores the incoming pre-filtering decoded image from the adding unit 23 and the incoming post-filtering decoded image from the in-loop filter 24.

The switch 26 reads the pre-filtering decoded image, which is used for intra-prediction, out of the frame memory 25, and supplies the read decoded image as a reference image, to the intra-prediction unit 30. The switch 26 reads also the post-filtering decoded image, which is used for inter-prediction, out of the frame memory 25, and supplies the read decoded image as a reference image, to the inter-prediction unit 35.

The intra-prediction unit 30 executes an intra-prediction process, based on the original image and the decoded image. For example, the intra-prediction unit 30 evaluates cost based on predicted errors and the volume of codes generated, for each of prediction mode candidates included in a search range. The intra-prediction unit 30 then selects a prediction mode that makes the cost the minimum, as an optimum prediction mode. In addition, the intra-prediction unit 30 generates a predicted image according to the selected optimum prediction mode. The intra-prediction unit 30 then outputs the predicted image and a cost corresponding thereto, together with some control parameters containing prediction mode information, to the mode setting unit 40.

The inter-prediction unit 35 executes an inter-prediction process (motion compensation), based on the original image and the decoded image. For example, the inter-prediction unit 35 evaluates cost based on predicted errors and the volume of codes generated, for each of prediction mode candidates included in a search range. The inter-prediction unit 35 then selects a prediction mode that makes the cost the minimum, as an optimum prediction mode. In addition, the inter-prediction unit 35 generates a predicted image according to the selected optimum prediction mode. The inter-prediction unit 35 then outputs the predicted image and a cost corresponding thereto, together with some control parameters containing prediction mode information, to the mode setting unit 40.

Based on comparison between the incoming cost from the intra-prediction unit 30 and the incoming cost from the inter-prediction unit 35, the mode setting unit 40 sets a prediction type of each block. For a block of which a prediction type is set as intra-prediction, the mode setting unit 40 outputs the predicted image generated by the intra-prediction unit 30 to the deducting unit 13 and to the adding unit 23. For a block of which a prediction type is set as inter-prediction, the mode setting unit 40 outputs the predicted image generated by the inter-prediction unit 35 to the deducting unit 13 and to the adding unit 23. In addition, the mode setting unit 40 outputs control parameters to be coded, to the reversible coding unit 16.

(2) Functionality Related to Quantizing Matrix Generation

Among various components illustrated in FIG. 8, the block setting unit 111, the basic QM setting unit 113, the QM memory unit 115a, the QM generating unit 117a, and the SL coding unit 119 are mainly involved in quantizing matrix generation performed by the encoder.

The block setting unit 111 divides each image into a plurality of transform blocks through QTBT block division, thus setting a plurality of transform blocks in each of a series of images. In addition, the block setting unit 111 generates block division data that defines the block structures of set transform blocks, and outputs the generated block division data to the reversible coding unit 16. The size of a transform block set by the block setting unit 111 may range, for example, from 2×2 to 128×128. The shape of the transform block may be square or non-square. Some examples of the shapes and sizes of transform blocks are illustrated in FIG. 2.

The basic QM setting unit 113 sets basic quantizing matrices of one or more sizes, as quantizing matrices used by the image processing device 10a. Typically, a basic quantizing matrix has at least one element different in value from an element of an existing quantizing matrix defined by FVC specifications. The value of an element of the basic quantizing matrix can be determined, for example, as a result of a preliminary image analysis or parameter tuning. For each size, the basic QM setting unit 113 can set a plurality of types of quantizing matrices different in combination of prediction type and color component from each other. A quantizing matrix of a certain type may be identical with a quantizing matrix of another type. In one example, basic quantizing matrices include square quantizing matrices only. In another example, basic quantizing matrices include both square quantizing matrices and non-square quantizing matrices. In an example of syntax, which will be described later on, the size of a quantizing matrix is identified with a size ID and the type of the same is identified with a matrix ID.

The QM memory unit 115a is a memory module that stores various types of quantizing matrices having various sizes, the quantizing matrices being used by the image processing device 10a. Quantizing matrices stored in the QM memory unit 115a include basic quantizing matrices set by the basic QM setting unit 113 and additional quantizing matrices additionally generated by the QM generating unit 117a, which will be described later on. According to this embodiment, a basic quantizing matrix is set prior to orthogonal transformation and quantization performed across a plurality of transform blocks, and is stored in the QM memory unit 115a through these processes of orthogonal transformation and quantization. An additional quantizing matrix, on the other hand, is generated according to a need when transform coefficients of each transform block are quantized, and is stored in the QM memory unit 115a. The QM memory unit 115a may manage matrix management information that is internal control information indicating the size of the quantizing matrix present already. The matrix management information is composed of, for example, a set of flags indicating whether a quantizing matrix identified with two size IDs corresponding respectively to a horizontal size and a vertical size is present (i.e., for example, is generated already).

When the quantizing unit 15a quantizes transform coefficients of each transform block, the QM generating unit 117a determines whether a quantizing matrix equal in size to the transform block is already generated, by referring to the above matrix management information provided by the QM memory unit 115a. When the quantizing matrix equal in size to the transform block is already generated, the QM generating unit 117a reads that quantizing matrix already generated, out of the QM memory unit 115a. When the quantizing matrix equal in size to the transform block is not generated yet, on the other hand, the QM generating unit 117a selects one of basic quantizing matrices already generated, as a reference quantizing matrix, and re-samples the selected reference quantizing matrix to generate an additional quantizing matrix. The QM generating unit 117a includes a memory in which a reference quantizing matrix to be re-sampled or its partial matrix is stored temporarily.

For example, when zeroing of high-frequency components is not applied to a transform block of a subject size, the QM generating unit 117a generates a quantizing matrix for the transform block by referring to the whole of a reference quantizing matrix. When zeroing of high-frequency components is applied to a transform block of another subject size, on the other hand, the QM generating unit 117a generates a quantizing matrix for the transform block by referring to only the partial matrix of a reference quantizing matrix. In the latter case, a ratio of the size of the partial matrix referred to (i.e., partial matrix stored temporarily in the memory of the QM generating unit 117a), to the size of the reference quantizing matrix is equal to a ratio of the size of a non-zero part to the size of an additional quantizing matrix generated. In this manner, the quantizing unit 15a quantizes transform coefficients of each transform block, using one of various quantizing matrices which are generated as resources are saved.

In an example, the QM generating unit 117a may determine whether zeroing is applied to a transform block, according to a specification-based rule that predetermines the size of the transform block to which zeroing is to be applied. In another example, the QM generating unit 117a may determine that zeroing is applied to a certain transform block and is not applied to another transform block, according to control by the coding control unit 11. In the latter example, one or both of the above-described zeroing flags and zeroing size information, the zeroing flags indicating whether zeroing is applied to a transform block and the zeroing size information indicating the size of the transform block to which zeroing is to be applied, can be coded as control parameters and inserted in a coded stream.

The SL coding unit 119 codes a scaling list expressing the above-described basic quantizing matrix set by the basic QM setting unit 113 to generate scaling list data. The scaling list data is inserted in a coded stream generated by the reversible coding unit 16.

In an example, the SL coding unit 119 includes size specifying information in the scaling list data, the size specifying information indicating the size of the quantizing matrix signaled explicitly as a basic quantizing matrix, via the scaling list data. When the number of sizes of quantizing matrices signaled via the scaling list data varies, the SL coding unit 119 may include also size count information in the scaling list data, the size count information indicating the number of sizes that is to be signaled. In this case, a bit stream constraint may be imposed to provide that when two or more sizes are signaled, they should be different from each other (i.e., should be identified with different size IDs). Such a bit stream constraint prevents the encoder from redundantly encoding the size specifying information, thus reducing coding volume overhead to avoid a waste of resources.

In another example, the size of a basic quantizing matrix signaled explicitly via the scaling list data is predetermined as a specification-based rule. In this case, the SL coding unit 119 does not include the above size specifying information and size count information in the scaling list data.

[2-2. Examples of Syntax and Semantics]

The following table 1 shows the syntax of HEVC scaling list data described in the reference document REF2.

TABLE 1

Syntax of scaling list data in HEVC (excerpted from Section 7.3.4, REF2)

```
scaling_list_data( ) {
    for( sizeId = 0; sizeId < 4; sizeId++ )
        for( matrixId = 0; matrixId < 6; matrixId += ( sizeId = = 3 ) ? 3 : 1 ) {
            scaling_list_pred_mode_flag[ sizeId ][ matrixId ]
            if( !scaling_list_pred_mode_flag[ sizeId ][ matrixId ] )
                scaling_list_pred_matrix_id_delta[ sizeId ][ matrixId ]
            else {
                nextCoef = 8
                coefNum = Min( 64, ( 1 << ( 4 + ( sizeId << 1 ) ) ) )
                if( sizeId > 1 ) {
                    scaling_list_dc_coef_minus8[ sizeId − 2 ][ matrixId ]
                    nextCoef = scaling_list_dc_coef_minus8[ sizeId − 2 ][ matrixId ] + 8
                }
                for( i = 0; i < coefNum; i++) {
                    scaling_list_delta_coef
                    nextCoef = ( nextCoef + scaling_list_delta_coef + 256 ) % 256
                    ScalingList[ sizeId ][ matrixId ][ i ] = nextCoef
                }
            }
        }
}
```

HEVC scaling list data includes one or more of the following control parameters for each of combinations of four sizes, which are identified with size IDs ("sizeId"), and six types, which are identified with matrix IDs ("matrixId").

scaling_list_pred_mode_flag[sizeId][matrixId]
scaling_list_pred_matrix_id_delta[sizeId][matrixId]
scaling_list_dc_coef_minus8[sizeId-2][matrixId]
scaling_list_delta_coef "scaling_list_pred_mode_flag[sizeId][matrixId]" is a control flag for switching a coding method for the scaling list. A quantizing matrix of a type for which this flag is set false is coded simply, by referring to a quantizing matrix of another type specified by "scaling_list_pred_matrix_id_delta[sizeId][matrixId]". A quantizing matrix for which the above control flag is set true, on the other hand, is coded differentially, using "scaling_list_dc_coef_minus8[sizeId-2][matrixId]" and a plurality of "scaling_list_delta_coef". The number of "scaling_list_delta_coef" is indicated by an intermediate variable "coefNum".

The following table 2 shows an example of the syntax of scaling list data that may be revised in this embodiment. The example of table 2 includes the size specifying information indicating the size of the quantizing matrix generated as a basic quantizing matrix, the size specifying information having been described in [1-5. Controlling Size of Basic Quantizing Matrix].

TABLE 2

Example of the revised syntax of scaling list data

```
scaling_list_data( ) {
  size_id_minusX
  sizeId = size_id_minusX + X
  for( matrixId = 0; matrixId < 6; matrixId ++ ) {
    scaling_list_pred_mode_flag[ sizeId ][ matrixId ]
    if( !scaling_list_pred_mode_flag[ sizeId ][ matrixId ] )
      scaling_list_pred_matrix_id_delta[ sizeId ][ matrixId ]
    else {
      coefNum = Min( 64, ( 1 << ( 2 + ( sizeId << 1 ) ) ) )
      for( i = 0; i < coefNum; i++) {
        scaling_list_delta_coef[ i ]
      }
    }
  }
}
```

Specifically, a parameter "size_id_minusX" on the second line of table 2 represents the size specifying information. A value for the parameter "size_id_minusX" is given by deducting a preset offset value X from an actual size ID.

The following table 3 shows an example of size ID definitions that may be revised from size ID definitions in HEVC.

TABLE 3

Examples of revised size ID definitions

| Size of a square quantizing matrix | Size ID |
| --- | --- |
| 2 × 2 | 0 |
| 4 × 4 | 1 |
| 8 × 8 | 2 |
| 16 × 16 | 3 |
| 32 × 32 | 4 |
| 64 × 64 | 5 |
| 128 × 128 | 6 |

In the example of table 3, indexes of 0 to 6, which serve as size IDs, are assigned respectively to candidate values (2 to 128) for the size of one side of a square quantizing matrix in descending order in which the smallest index is on the top. In this example, a relationship between a candidate value N for the size of one side and a value "sizeId" for a size ID is given by the following equation.

$$N=1<<(sizeId+1)$$

It should be noted, however, that the relationship between the size candidate value and the size ID is not limited to the relationship defined by the above equation.

The size of a non-square quantizing matrix can be determined by specifying a size ID in the horizontal direction and a size ID in the vertical direction as well. In the example of the syntax of table 2, the size specifying information includes only one parameter "size_id_minusX". This means that only the square quantizing matrix is signaled explicitly as the basic quantizing matrix. It also implies that a quantizing matrix of a size identified with a size ID smaller than the offset value X is not signaled. Not limited to the above example, the size specifying information may include two parameters that indicate two size IDs for identifying a non-square basic quantizing matrix, respectively. Further, deduction of the offset value may be omitted, in which case a size ID from which no offset value is deducted is coded directly.

The following table 4 shows an example of matrix ID definitions that may be revised from matrix ID definitions in HEVC.

TABLE 4

Examples of revised matrix ID definitions

| Prediction type | Component ID (color component) | Matrix ID |
| --- | --- | --- |
| Intra | 0 (Y) | 0 |
| Intra | 1 (Cb) | 1 |
| Intra | 2 (Cr) | 2 |
| Inter | 0 (Y) | 3 |
| Inter | 1 (Cb) | 4 |
| Inter | 2 (Cr) | 5 |

According to the definition in HEVC that has been described referring to FIG. 1, the definition of the matrix ID becomes exceptional definition in a case of size ID=3 (32×32). In the example of table 4, however, the definition of matrix ID remains common definition regardless of the value of the size ID. This fact leads to a difference between a matrix ID loop on the third line of the syntax of table 1 and a matrix ID loop on the fourth line of the syntax of table 2. The maximum number of element values to be coded differentially, the maximum number being indicated by the intermediate variable "coefNum", is 64 in both of the syntax of table 1 and the syntax of table 2. To allow more flexible quantizing matrix designing, however, this maximum number may be changed or set variably.

[2-3. Selecting Reference Quantizing Matrix]

Which quantizing matrix should be referred to at generation of an additional quantizing matrix may be determined according to any given rule. In a simple example, a quantizing matrix of a largest size may be selected out of square quantizing matrices available, as a reference quantizing matrix. In this example, a size ID for the quantizing matrix of the largest size to be signaled explicitly is defined as "maxSignaledSizeId", and whether a quantizing matrix identified with a certain combination of a side ID and a matrix ID is present is indicated by matrix management information "QMAvailFlag[sizeId][matrixId]" (in which case the quantizing matrix identified with the combination is present when "QMAvailFlag[sizeId][matrixId]" is true, and is not present when the same is false). Thus, a reference size ID "refSizeId", which indicates the size of a reference quantizing matrix, can be determined by the following pseudo codes.

TABLE 5

Example of pseudo codes for determining
the size of a reference quantizing matrix

```
for (sizeId=0; sizeId<=maxSignaledSizeId; sizeId++){
    if ( QMAvailFlag[sizeId][matrixId]==1 ){
        refSizeId = sizeId
    }
}
```

In another example, a quantizing matrix with a smallest size difference with an additional quantizing matrix to be generated may be selected out of quantizing matrices available, as a reference quantizing matrix. Further, reference quantizing matrix information indicating which quantizing matrix should be referred to may be additionally coded.

[2-4. Re-Sampling Method]

An example of a specific method of re-sampling for additionally generating a quantizing matrix will then be described. In this example, it is assumed, for simpler description, that zeroing of high-frequency components is applied to a subject transform block on the condition that the size of at least one side of the subject transform block is larger than the upper limit $N_{TH}$. What will be described below can apply also to a case where the condition for applying zeroing is made different by a slight modification that would be obvious to those who skilled in art.

First, a case is assumed where a first quantizing matrix of a first size is selected as a reference quantizing matrix for generating a second quantizing matrix of a second size. In this assumed case, the first size is $W_1 \times H_1$ and the second size is $W_2 \times H_2$. Using one of the following two equations, a flag "zoFlag" can be set, the flag indicating whether zeroing of high-frequency components is applied to a transform block of the second size.

$$zoFlag = \max(W_2, H_2) > N_{TH}$$

$$zoFlag = W_2 > N_{TH} || H_2 > N_{TH}$$

According to these equations, the flag "zoFlag" is set to 1 when zeroing of high-frequency components is applied to the transform block of the second size ($W_2 \times H_2$), and is set to 0 when the zeroing is not applied to the same.

When ranges of elements of the second quantizing matrix, the elements being actually generated through re-sampling, are defined such that a range in the horizontal direction is $R_{WIDTH2}$ and a range in the vertical direction is $R_{HEIGHT2}$, these ranges are given by the following equations.

$$W_{R2} = \min(W_2, N_{TH})$$

$$H_{R2} = \min(H_2, N_{TH})$$

$$R_{WIDTH2} = [0, W_{R2} - 1]$$

$$R_{HEIGHT2} = [0, H_{R2} - 1]$$

In these equations, $W_{R2}$ and $H_{R2}$ denote the number of elements included in the range in the horizontal direction and the number of elements included in the range in the vertical direction, respectively. A ratio $r_{WIDTH2}$ of the size of a non-zero part (part to which zeroing is not applied) to the second size ($W_2 \times H_2$) in the horizontal direction and a ratio $r_{HEIGHT2}$ of the same in the vertical direction can be given by the following equations.

$$r_{WIDTH2} = W_{R2}/W_2$$

$$r_{HEIGHT2} = H_{R2}/H_2$$

Using these ratios $r_{WIDTH2}$ and $r_{HEIGHT2}$, a range in the horizontal direction $R_{WIDTH1}$ of a part of the first quantizing matrix that is referred to at generation of the non-zero part of the second quantizing matrix and a range in the vertical direction $R_{HEIGHT1}$ of the same can be derived as follows.

$$W_{R1} = W_1 \cdot r_{WIDTH2}$$

$$H_{R1} = H_1 \cdot r_{HEIGHT2}$$

$$R_{WIDTH1} = [0, W_{R1} - 1]$$

$$R_{HEIGHT1} = [0, H_{R1} - 1]$$

In these equations, $W_{R1}$ and $H_{R1}$ denote the number of elements included in the range in the horizontal direction and the number of elements included in the range in the vertical direction, respectively.

As it is understood from the above description, when zeroing is applied to the subject transform block, the second quantizing matrix for quantizing transform coefficients (or inversely quantizing quantized transform coefficients) of the subject transform block can be generated by referring to only the partial matrix of the first quantizing matrix of the first size $W_1 \times H_1$. When zeroing is not applied to the subject transform block, on the other hand, $W_{R2} = W_2$ and $H_{R2} = H_2$ result, which yields $r_{WIDTH2} = r_{HEIGHT2} = 1$ thus giving $W_{R1} = W_1$ and $H_{R1} = H_1$. In this case, to generate the second quantizing matrix, the whole of the first quantizing matrix is referred to. Thus, when zeroing of high-frequency components is applied to the subject transform block, the QM generating unit 117a reads, for re-sampling, only the elements that are included in reference ranges $R_{WIDTH1}$ and $R_{HEIGHT1}$ among the entire elements of the reference quantizing matrix, out of the QM memory unit 115a and buffers the read elements. When zeroing is not applied to the subject transform block, the QM generating unit 117a reads the entire elements of the reference quantizing matrix out of the QM memory unit 115a and buffers the read elements.

When a ratio of the first size to the second size in the horizontal direction is denoted as $s_{WIDTH}$ and a ratio of the same in the vertical direction is denoted as $s_{HEIGHT}$, the size ratios $s_{WIDTH}$ and $s_{HEIGHT}$ are given as follows.

$$s_{WIDTH} = W_1/W_2$$

$$s_{HEIGHT} = H_1/H_2$$

For example, a process of up-sampling a first quantizing matrix $Q_{REF}$ by the nearest neighboring algorithm to derive elements $Q_{ADD}[j][i]$ of a second quantizing matrix $Q_{ADD}$ can be expressed by equations shown below, using the size ratios $s_{WIDTH}$ and $s_{HEIGHT}$. Note that j and i are indexes denoting a line and a column, respectively. It is assumed that the entire elements of the second quantizing matrix are reset to 0 before execution of re-sampling.

$$j' = \text{Floor}(j \cdot s_{WIDTH})$$

$$i' = \text{Floor}(i \cdot s_{HEIGHT})$$

$$Q_{ADD}[j][i] = Q_{REF}[j'][i'] \text{ (for } i \in R_{WIDTH2}, j \in R_{HEIGHT2})$$

In the equations, Floor(x) denotes a function that returns a maximum integer equal to or smaller than an argument x.

A process of down-sampling the first quantizing matrix $Q_{REF}$ to derive the elements $Q_{ADD}[j][i]$ of the second quantizing matrix $Q_{ADD}$ can be expressed by an equation shown below. It is assumed that the entire elements of the second quantizing matrix are reset to 0 before execution of re-sampling.

$$Q_{ADD}[j][i]=Q_{REF}[j \cdot s_{WIDTH}][i \cdot s_{HEIGHT}] \text{ (for } i \in R_{WIDTH2}, i \in R_{HEIGHT2})$$

The methods of re-sampling described in this section are just an example. For example, it is also possible that up-sampling is executed in one direction of the matrix as down-sampling is executed in the other direction of the same. Obviously, it is also possible that re-sampling is not executed in one direction of the matrix. Furthermore, in up-sampling, other interpolation methods, such as bilinear interpolation and bicubic interpolation, may be adopted in place of the above-mentioned nearest neighboring algorithm.

[2-5. Flow of Quantization-Related Processes Executed at Coding]

(1) Overall Flow

Figure 9:
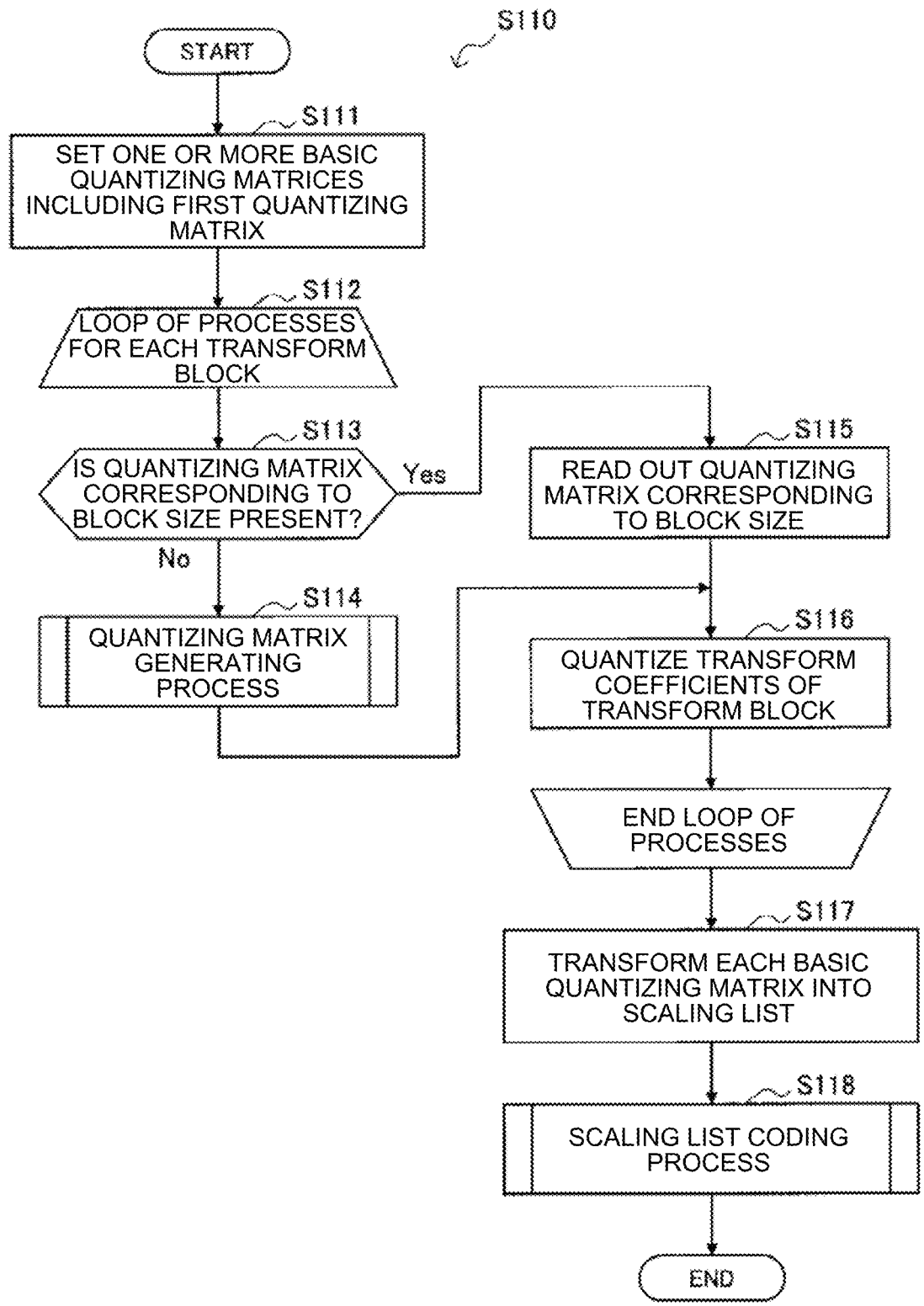
FIG. 9 is a flowchart illustrating an example of a flow of quantization-related processes executed by the encoder of FIG. 8.

FIG. 9 is a flowchart illustrating an example of a flow of quantization-related processes executed by the image processing device 10a of FIG. 8. In this flowchart, among various process steps included in a coding process, process steps not related to quantization are not described for the purpose of simpler description.

First, the basic QM setting unit 113 sets one or more basic quantizing matrices, which include a first quantizing matrix of a first size (step S111). These basic quantizing matrices are stored in the QM memory unit 115a.

A series of process steps S113 to S116 to follow are repeated for each of a plurality of transform blocks that are set in an image by the block setting unit 111 through QTBT block division (step S112). Each transform block for which these process steps are repeated is referred to as subject transform block.

The QM generating unit 117a first determines whether a quantizing matrix of the size corresponding to the block size of the subject transform block is present, by, for example, referring to matrix management information provided by the QM memory unit 115a (step S113). When such a quantizing matrix is not present, the QM generating unit 117a executes a quantizing matrix generating process, which will be described later on, to generate an additional quantizing matrix from a reference quantizing matrix (step S114). The additional quantizing matrix generated at this step is stored in the QM memory unit 115a. When the intended quantizing matrix is present already, the QM generating unit 117a reads that quantizing matrix of the size corresponding to the block size of the subject transform block, out of the QM memory unit 115a (step S115). Subsequently, the quantizing unit 15a quantizes transform coefficients of the subject transform block, using the additionally generated quantizing matrix or the quantizing matrix read out of the QM memory unit 115a (step S116).

The SL coding unit 119 turns each of one or more basic quantizing matrices set at step S111 into one-dimensional codes, thus transforming each of the basic quantizing matrices into a scaling list (step S117). The SL coding unit 119 then executes a scaling list coding process, which will be described later on, to generate scaling list data (step S118).

The quantized transform coefficients of each transform block, the quantized transform coefficients being generated at step S116, are coded by the reversible coding unit 16 so that the coded quantized transform coefficients, together with the scaling list data, become part of a coded stream. This process is not illustrated in FIG. 9. The scaling list data may be updated in any kind of updating unit, such as sequence, picture, slice, and tile.

(2) Quantizing Matrix Generating Process

Figure 10:
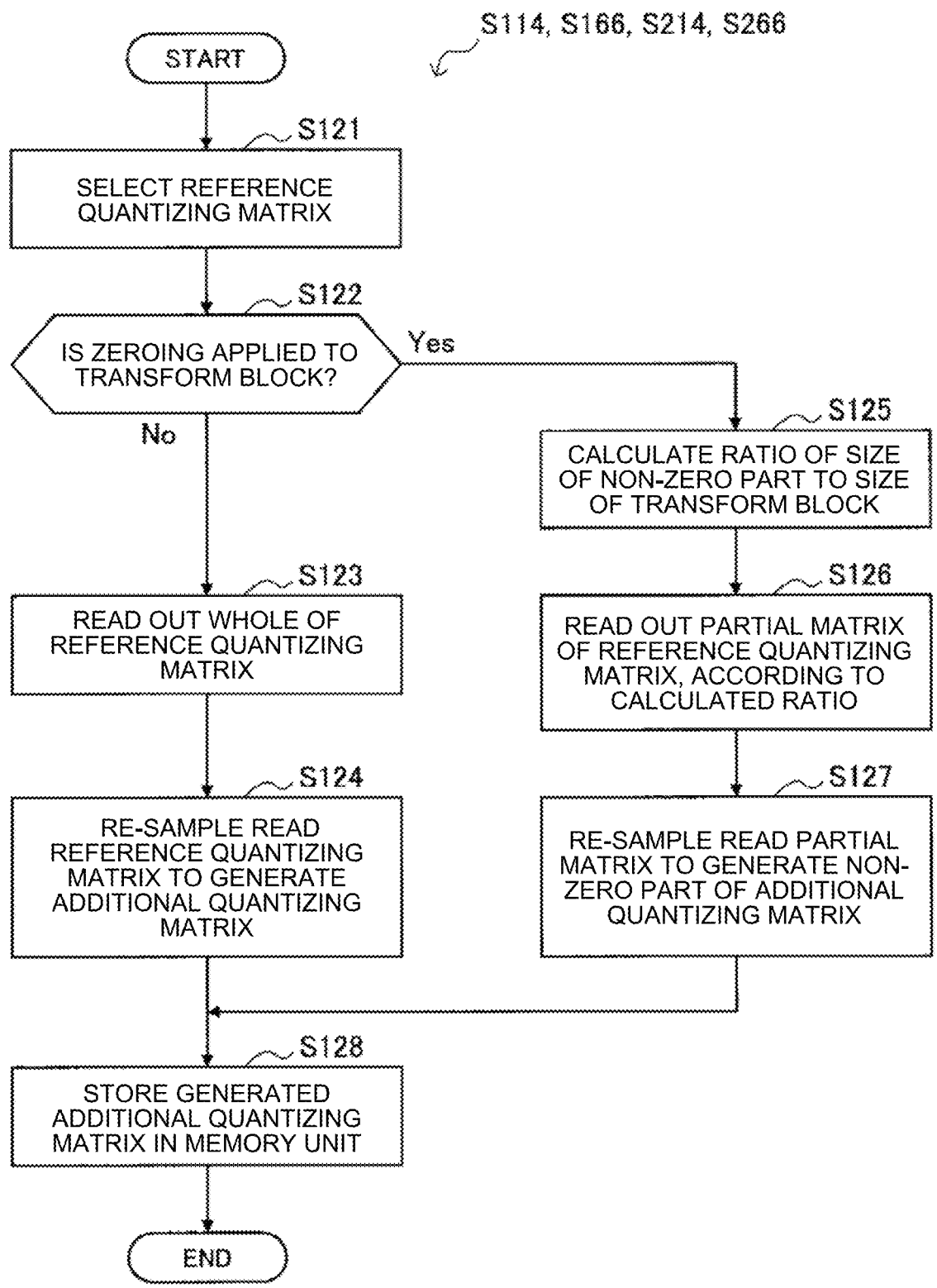
FIG. 10 is a flowchart illustrating an example of a flow of a quantizing matrix generating process.

FIG. 10 is a flowchart illustrating an example of a flow of the quantizing matrix generating process that can be executed at step S114 of FIG. 9.

First, the QM generating unit 117a selects a reference quantizing matrix that should be referred to at generation of the quantizing matrix for the subject transform block (step S121). In one example, the reference quantizing matrix may be selected according to a predetermined specification-based rule (e.g., a rule to select a quantizing matrix of a maximum size or a size closest to the size of the subject transform block, out of quantizing matrices available). In another example, the reference quantizing matrix may be selected dynamically.

Subsequently, the QM generating unit 117a determines whether zeroing of high-frequency components is applied to the subject transform block (step S122). In one example, the QM generating unit 117a may determine whether zeroing of high-frequency components is applied to the subject transform block, according to a predetermined specification-based rule (e.g., a rule to make a determination depending on whether the length of at least one side of the subject transform block is larger than a certain threshold). In another example, a determination on whether zeroing of high-frequency components is applied to the subject transform block may be changed dynamically.

When zeroing is not applied to the subject transform block, the QM generating unit 117a reads the whole of the reference quantizing matrix selected at step S121, out of the QM memory unit 115a, and buffers the read reference quantizing matrix by storing it in an internal memory (step S123). The QM generating unit 117a then re-sample the read reference quantizing matrix to generate an additional quantizing matrix (step S124).

When zeroing is applied to the subject transform block, on the other hand, the QM generating unit 117a calculates a ratio of the size of a non-zero part to the size of the subject transform block (e.g., the above-described ratios $r_{WIDTH2}$ and $r_{HEIGHT2}$) (step S125). Subsequently, according to the calculated ratio, the QM generating unit 117a reads a partial matrix of the selected reference quantizing matrix, out of the QM memory unit 115a, and buffers the read partial matrix by storing it in the internal memory (step S126). The QM generating unit 117a then re-sample the read partial matrix to generate a non-zero part of the additional quantizing matrix (step S127).

The QM generating unit 117a then stores the generated additional quantizing matrix in the QM memory unit 115a (step S168).

(3) Scaling List Coding Process

Figure 11:
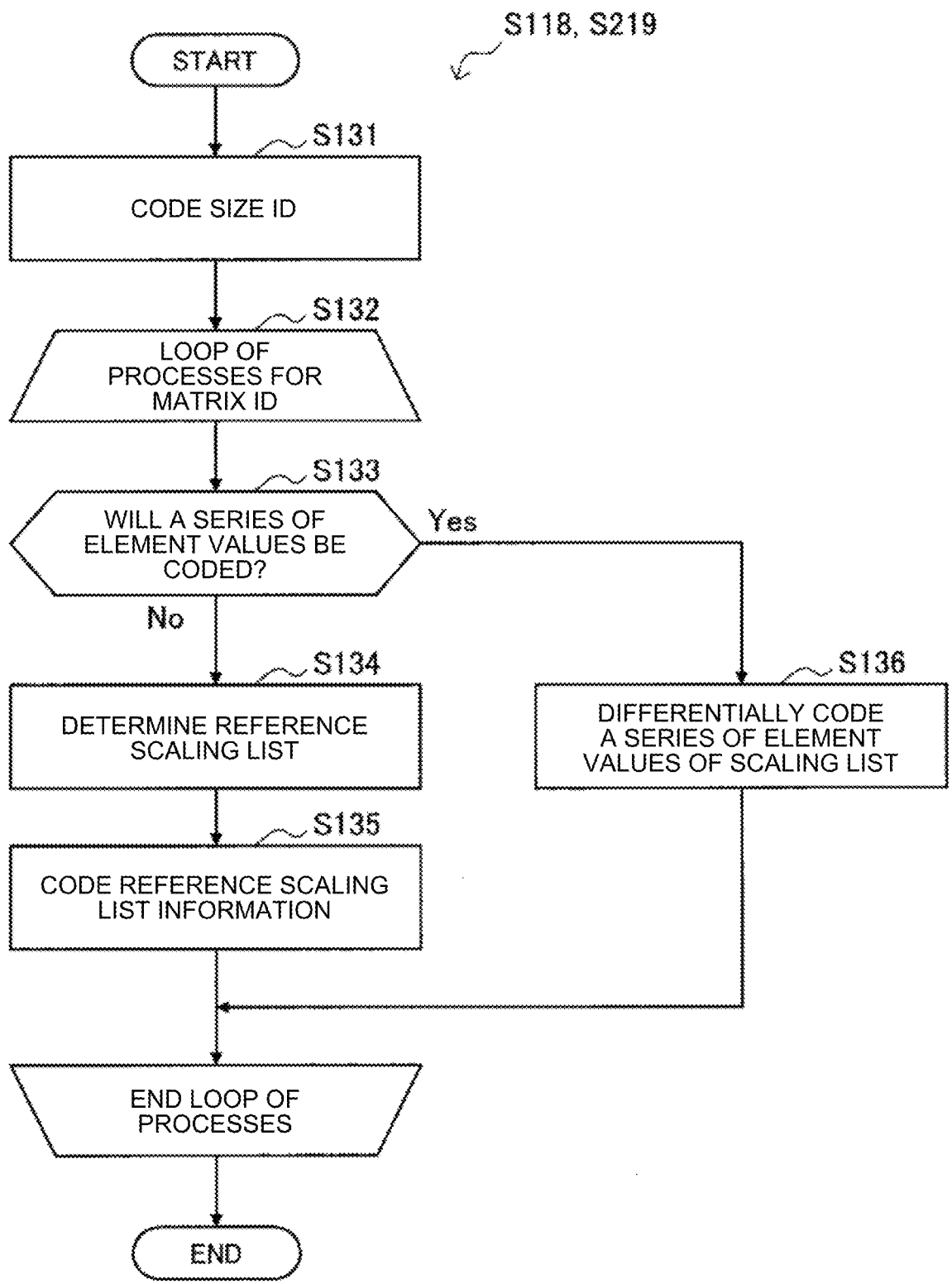
FIG. 11 is a flowchart illustrating an example of a flow of a scaling list coding process.

FIG. 11 is a flowchart illustrating an example of a flow of the scaling list coding process that can be executed at step S118 of FIG. 9.

First, the SL coding unit 119 codes size IDs for identifying sizes of basic quantizing matrices to generate size specifying information (step S131). When the basic quantizing matrices are always square matrices, one size ID is coded for one size, as shown in table 3. When the basic quantizing matrices include non-square matrices, however, two size IDs corresponding to two directions may be coded for one size. The size specifying information may be generated by deducting a preset offset value from a size ID.

A series of process steps S133 to S136 to follow are repeated for each of combinations of prediction types and color components, that is, each of quantizing matrix types identified by matrix IDs (step S132). A matrix ID for which the process steps are repeated is referred to as subject matrix ID.

The SL coding unit 119 determines whether or not to explicitly code a series of element values of a scaling list associated with the subject matrix ID (step S133). In other words, the SL coding unit 119 determines a coding method for the scaling list. For example, if the scaling list associated with the subject matrix ID is identical with a scaling list associated with a different matrix ID (for a matrix with the same size ID), the SL coding unit 119 can select a simpler method of coding reference scaling information only, instead of coding the element values.

When selecting such a simpler coding method, the SL coding unit 119 determines a reference scaling list (step S134), and codes reference scaling list information indicating the determined reference scaling list (step S135).

When selecting a method of coding a series of element values, on the other hand, the SL coding unit 119 codes a series of element values of the scaling list derived at step S117 of FIG. 9 by, for example, differential pulse code modulation (DPCM) to generate scaling list data (step S136).

The flowchart illustrated in FIG. 11 depicts an example in which size IDs for basic quantizing matrices are coded explicitly. In another example, coding of the sizes of the basic quantizing matrices may be omitted. In still another example, the number of sizes to be signaled may also be coded as size count information.

[2-6. Configuration of Decoder]
(1) Overall Configuration

Figure 12:
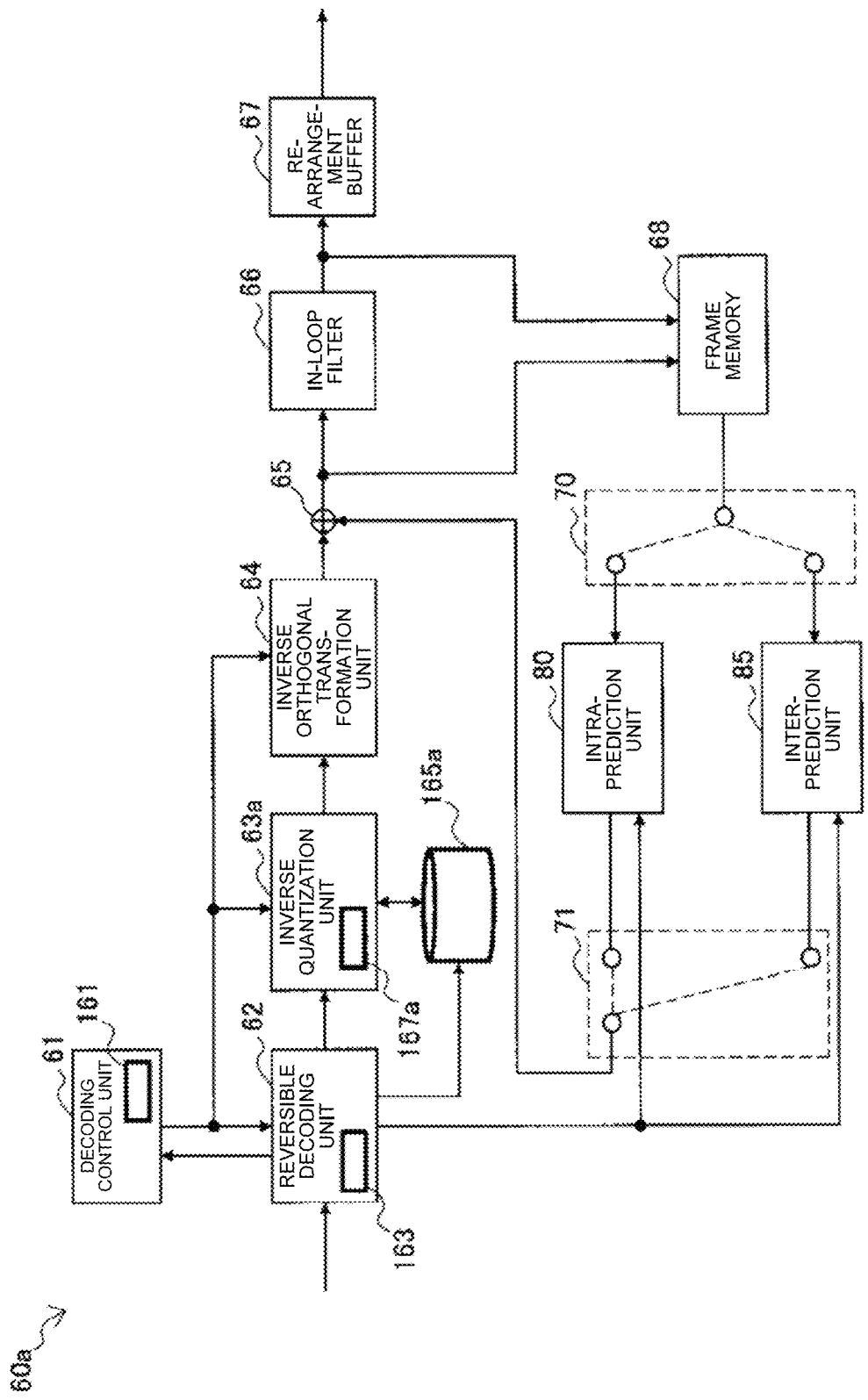
FIG. 12 is a block diagram illustrating an example of a configuration of a decoder according to the first embodiment.

FIG. 12 is a block diagram illustrating an example of a configuration of an image processing device 60a according to the first embodiment, the image processing device 60a having a functionality of a decoder. Referring to FIG. 12 reveals that the image processing device 60a includes a decoding control unit 61, a reversible decoding unit 62, an inverse quantizing unit 63a, an inverse orthogonal transformation unit 64, an adding unit 65, an in-loop filter 66, a rearrangement buffer 67, a frame memory 68, selectors 70 and 71, an intra-prediction unit 80, an inter-prediction unit 85, and a QM memory unit 165a.

The decoding control unit 61 controls the overall decoder functionality of the image processing device 60a, which will be described in detail below. According to this embodiment, the decoding control unit 61 includes a block setting unit 161. The block setting unit 161 is a module that executes the block setting process step S12, which has been described above referring to FIG. 4. This module will be described further later on.

The reversible decoding unit 62 parses control parameters included in an incoming coded stream from the transmission unit (not illustrated), such as a communication interface and an interface connecting to peripheral equipment. The control parameters parsed by the reversible decoding unit 62 include, for example, the above-mentioned block division data and scaling list data. The block division data is output to the decoding control unit 61. According to this embodiment, the reversible decoding unit 62 includes an SL decoding unit 163. The SL decoding unit 163 is a module that executes the scaling list decoding process step S13, which has been described above referring to FIG. 4. This module will be described further later on. The reversible decoding unit 62 decodes the coded stream to generate quantized data on each of one or more transform blocks. The reversible decoding unit 62 outputs the generated quantized data to the inverse quantizing unit 63a.

For each of one or more transform blocks set in an image, the inverse quantizing unit 63a inversely quantizes the incoming quantized data, i.e., quantized transform coefficients from the reversible decoding unit 62, to restore transform coefficients. The inverse quantizing unit 63a selects a quantizing matrix equal in size to a transform block out of a plurality of quantizing matrices stored in the QM memory unit 165a and uses the selected quantizing matrix to inversely quantize quantized transform coefficients of the transform block. Under control by the decoding control unit 61, the inverse quantizing unit 63a skips inverse quantization of frequency components forcibly rendered zero. The inverse quantizing unit 63a then outputs the restored transform coefficients to the inverse orthogonal transformation unit 64. According to this embodiment, the inverse quantizing unit 63a includes a QM generating unit 167a. The QM generating unit 167a is a module that executes the QM generating process step S14, which has been described above referring to FIG. 4. This module will be described further later on.

For each of one or more transform bocks, the inverse orthogonal transformation unit 64 executes inverse orthogonal transformation. This inverse orthogonal transformation may be executed, for example, as inverse discrete cosine transformation or inverse discrete sine transformation. More specifically, for each transform block, the inverse orthogonal transformation unit 64 subjects transform coefficients in the frequency domain, the transform coefficients coming from the inverse quantizing unit 63a, to inverse orthogonal transformation, thereby generating predicted errors, which represent a signal sample in the spacial domain. The inverse orthogonal transformation unit 64 then outputs the generated predicted errors to the adding unit 65.

The adding unit 65 adds up the incoming predicted errors from the inverse orthogonal transformation unit 64 and an incoming predicted image from the selector 71, to generate a decoded image. The adding unit 65 then outputs the generated decoded image to the in-loop filter 66 and to the frame memory 68.

The in-loop filter 66 is composed of a series of filters that are applied to the decoded image for the purpose of improving its quality. The in-loop filter 66 may include one or more of, for example, a bilateral filter, a de-blocking filter, an adaptive offset filter, and an adaptive loop filter, which are described in the reference document REF3. The in-loop filter 66 outputs the decoded image having been filtered through the series of filters, to the rearrangement buffer 67 and to the frame memory 68.

The rearrangement buffer 67 rearranges incoming images from the in-loop filter 66 to generate a time-based sequence of images making up audio. The rearrangement buffer 67 then outputs the generated sequence of images to external equipment (e.g., a display connected to the image processing device 60a).

The frame memory 68 stores the incoming pre-filtering decoded image from the adding unit 65 and the incoming post-filtering decoded image from the in-loop filter 66.

Depending on a prediction type for each block, the selector 70 switches a destination to which an image from the frame memory 68 is sent, between the intra-prediction unit 80 and the inter-prediction unit 85. For example, when intra-prediction is specified as the prediction type, the selector 70 outputs the pre-filtering decoded image as a reference image, the decoded image being supplied from the frame memory 68, to the intra-prediction unit 80. When inter-prediction is specified as the prediction type, the selector 70 outputs the post-filtering decoded image as a reference image, to the inter-prediction unit 85.

Depending on a prediction type for each block, the selector 71 switches a unit from which a predicted image to be supplied to the adding unit 65 is coming, between the intra-prediction unit 80 and the inter-prediction unit 85. For example, when intra-prediction is specified as the prediction type, the selector 71 supplies a predicted image coming from the intra-prediction unit 80, to the adding unit 65. When inter-prediction is specified as the prediction type, the selector 71 supplies a predicted image coming from the inter-prediction unit 85, to the adding unit 65.

The intra-prediction unit 80 performs intra-prediction, based on information on intra-prediction obtained by parsing the coded stream and on a reference image from the frame memory 68, to generate a predicted image. The intra-prediction unit 80 then outputs the generated predicted image to the selector 71.

The inter-prediction unit 85 performs inter-prediction, based on information on inter-prediction obtained by parsing the coded stream and on a reference image from the frame memory 68, to generate a predicted image. The inter-prediction unit 85 then outputs the generated predicted image to the selector 71.

(2) Functionality Related to Quantizing Matrix Generation

Among various components illustrated in FIG. 12, the block setting unit 161, the SL decoding unit 163, the QM memory unit 165a, and the QM generating unit 167a are mainly involved in quantizing matrix generation performed by the decoder.

The block setting unit 161 sets a plurality of transform blocks in each image through QTBT block division, which is executed according to block division data. The size of a transform block set by the block setting unit 161 may range, for example, from 2×2 to 128×128. The shape of the transform block may be square or non-square. Some examples of the shapes and sizes of transform blocks are illustrated in FIG. 2.

The SL decoding unit 163 decodes scaling list data to generate basic quantizing matrices of one or more sizes. In an example, the SL decoding unit 163 decodes size specifying information indicating the sizes of quantizing matrices generated from the scaling list data. In this example, by referring to the size specifying information, the SL decoding unit 163 recognizes the size of the quantizing matrix signaled explicitly as a basic quantizing matrix via the scaling list data. The SL decoding unit 163 may also decode size count information indicating the number of sizes to be signaled. In this case, a bit stream constraint may be imposed to provide that when two or more sizes are signaled, they should be different from each other (i.e., should be identified with different size IDs). Such a bit stream constraint prevents the encoder from redundantly encoding the size specifying information, thus reducing coding volume overhead to avoid a waste of resources. In another example, the size of a basic quantizing matrix signaled explicitly via the scaling list data is predetermined as a specification-based rule. In this case, the scaling list data does not include the above size specifying information and size count information, and the SL decoding unit 163 decodes the scaling list data on each of one or more predetermined sizes to generate quantizing matrices of the one or more sizes.

The SL decoding unit 163 stores basic quantizing matrices generated based on the scaling list data in the QM memory unit 165a. As escribed above, a plurality of types of basic quantizing matrices different in combination of prediction type and color component from each other may be present for each size. A basic quantizing matrix may be generated by decoding a series of differentially coded element values or by referring to a basic quantizing matrix of a different type. In one example, basic quantizing matrices include square quantizing matrices only. In another example, basic quantizing matrices include both square quantizing matrices and non-square quantizing matrices. Examples of the syntax of scaling list data have been described above in [2-2. Examples of Syntax and Semantics].

The QM memory unit 165a is a memory module that stores various types of quantizing matrices having various sizes, the quantizing matrices being used by the image processing device 60a. Quantizing matrices stored in the QM memory unit 165a include basic quantizing matrices generated by the SL decoding unit 163 and additional quantizing matrices additionally generated by the QM generating unit 167a, which will be described later on. According to this embodiment, a basic quantizing matrix is generated prior to inverse quantization and inverse orthogonal transformation performed across a plurality of transform blocks, and is stored in the QM memory unit 165a through these processes of inverse orthogonal transformation and inverse quantization. An additional quantizing matrix, on the other hand, is generated according to a need when quantized transform coefficients of each transform block are inversely quantized, and is stored in the QM memory unit 165a. The QM memory unit 165a may manage matrix management information indicating the size of the quantizing matrix present already, similarly to the QM memory unit 115a on the encoder side. The matrix management information is composed of, for example, a set of flags indicating whether a quantizing matrix identified with two size IDs corresponding respectively to a horizontal size and a vertical size is present.

When the inverse quantizing unit 63a inversely quantizes quantized transform coefficients of each transform block, the QM generating unit 167a determines whether a quantizing matrix equal in size to the transform block is already generated based on scaling list data, by referring to the matrix management information provided by the QM memory unit 165a. When the quantizing matrix equal in size to the transform block is already generated, the QM generating unit 167a reads that quantizing matrix already generated, out of the QM memory unit 165a. When the quantizing matrix equal in size to the transform block is not generated yet, the QM generating unit 167a re-samples one of basic quantizing matrices already generated or a partial matrix thereof to generate an additional quantizing matrix. The QM generating unit 167a includes a memory that temporarily stores a reference quantizing matrix or its partial matrix to be re-sampled.

When zeroing of high-frequency components is not applied to a transform block of a subject size, for example, the QM generating unit 167a generates a quantizing matrix for the transform block by referring to the whole of a reference quantizing matrix. When zeroing of high-frequency components is applied to a transform block of another subject size, on the other hand, the QM generating unit 167a generates a quantizing matrix for the transform block by referring to only the partial matrix of a reference quantizing matrix. As described above, a ratio of the size of the partial matrix referred to, to the size of the reference quantizing matrix is equal to a ratio of the size of a non-zero part to the size of an additional quantizing matrix generated. An example of equations for calculating these ratios has been described above in [2-4. Re-sampling Method]. In this manner, the inverse quantizing unit 63a inversely quantizes quantized transform coefficients of each transform bock, using one of various quantizing matrices that are generated as resources are saved.

In an example, the QM generating unit 167a may determine whether zeroing is applied to a transform block, according to a specification-based rule that predetermines the size of the transform block to which zeroing is to be applied. In another example, the QM generating unit 167a may determine whether zeroing is applied to a transform block, based on one or more control parameters that can be additionally obtained by parsing the coded stream, such as a zeroing flag indicating whether zeroing is applied to a transform block and zeroing size information indicating the size of the transform block to which zeroing is to be applied. Examples of these control parameters have been described above in [1-4. Zeroing Control]

[2-7. Flow of Inverse-Quantization-Related Processes Executed at Decoding]

(1) Overall Flow

Figure 13:
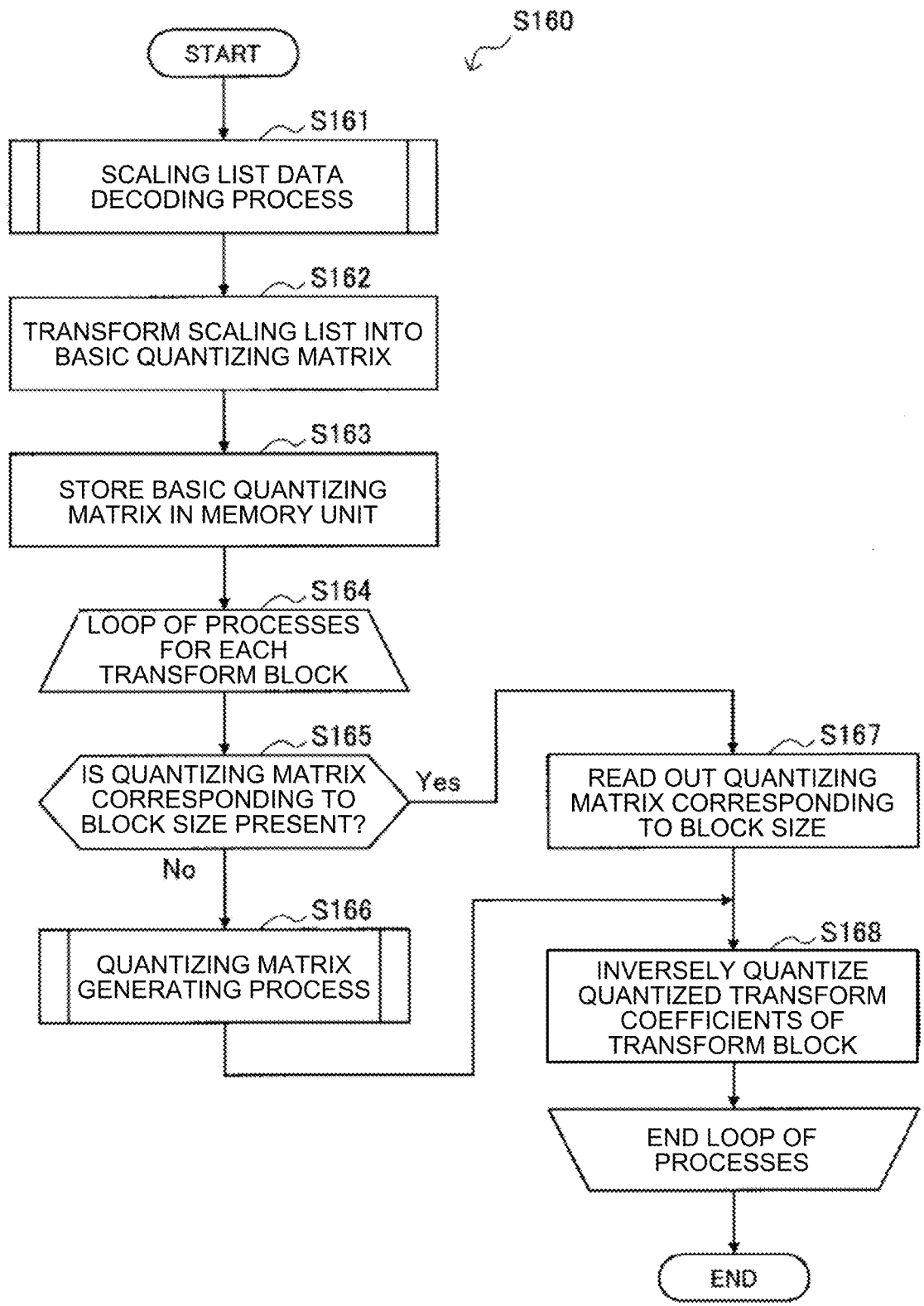
FIG. 13 is a flowchart illustrating an example of a flow of inverse-quantization-related processes executed by the decoder of FIG. 12.

FIG. 13 is a flowchart illustrating an example of a flow of inverse-quantization-related processes executed by the image processing device 60a of FIG. 12. In this flowchart, among various process steps included in a decoding process, process steps not related to inverse quantization are not described for the purpose of simpler description.

First, the SL decoding unit 163 executes a scaling list data decoding process, which will be described later on, to generate scaling lists expressing basic quantizing matrices of one or more sizes (step S161). Subsequently, the SL decoding unit 163 maps each scaling list, which is an array of one-dimensional element values, into a two-dimensional array of element values through a certain scan sequence, thus transforming the scaling list into a basic quantizing matrix (step S162). The QM memory unit 165a stores the basic quantizing matrix generated in this manner (step S163).

A series of process steps S165 to S168 to follow are repeated for each of a plurality of transform blocks that are set in an image by the block setting unit 161 through QTBT block division (step S164). Each transform block for which these process steps are repeated is referred to as subject transform block.

The QM generating unit 167a first determines whether a quantizing matrix of the size corresponding to the block size of the subject transform block is present, by, for example, referring to matrix management information provided by the QM memory unit 165a (step S165). When such a quantizing matrix is not present, the QM generating unit 167a executes the quantizing matrix generating process, which has been described above referring to FIG. 10, to generate an additional quantizing matrix from a reference quantizing matrix (step S166). The additional quantizing matrix generated at this step is stored in the QM memory unit 165a. When the intended quantizing matrix is present already, on the other hand, the QM generating unit 167a reads that quantizing matrix of the size corresponding to the block size of the subject transform block, out of the QM memory unit 165a (step S167). Subsequently, the inverse quantizing unit 63a inversely quantizes quantized transform coefficients of the subject transform block, using the additionally generated quantizing matrix or the quantizing matrix read out of the QM memory unit 165a (step S168).

Transform coefficients in the frequency domain, which are generated as a result of the inverse quantization at step S168, are transformed by the inverse orthogonal transformation unit 64 into predicted errors, which represent a signal sample in the spacial domain. This process is not depicted in FIG. 13. In correspondence to updating of the scaling list data, the quantizing matrix may be updated in any kind of updating unit, such as sequence, picture, slice, and tile.

(2) Scaling List Data Decoding Process

Figure 14:
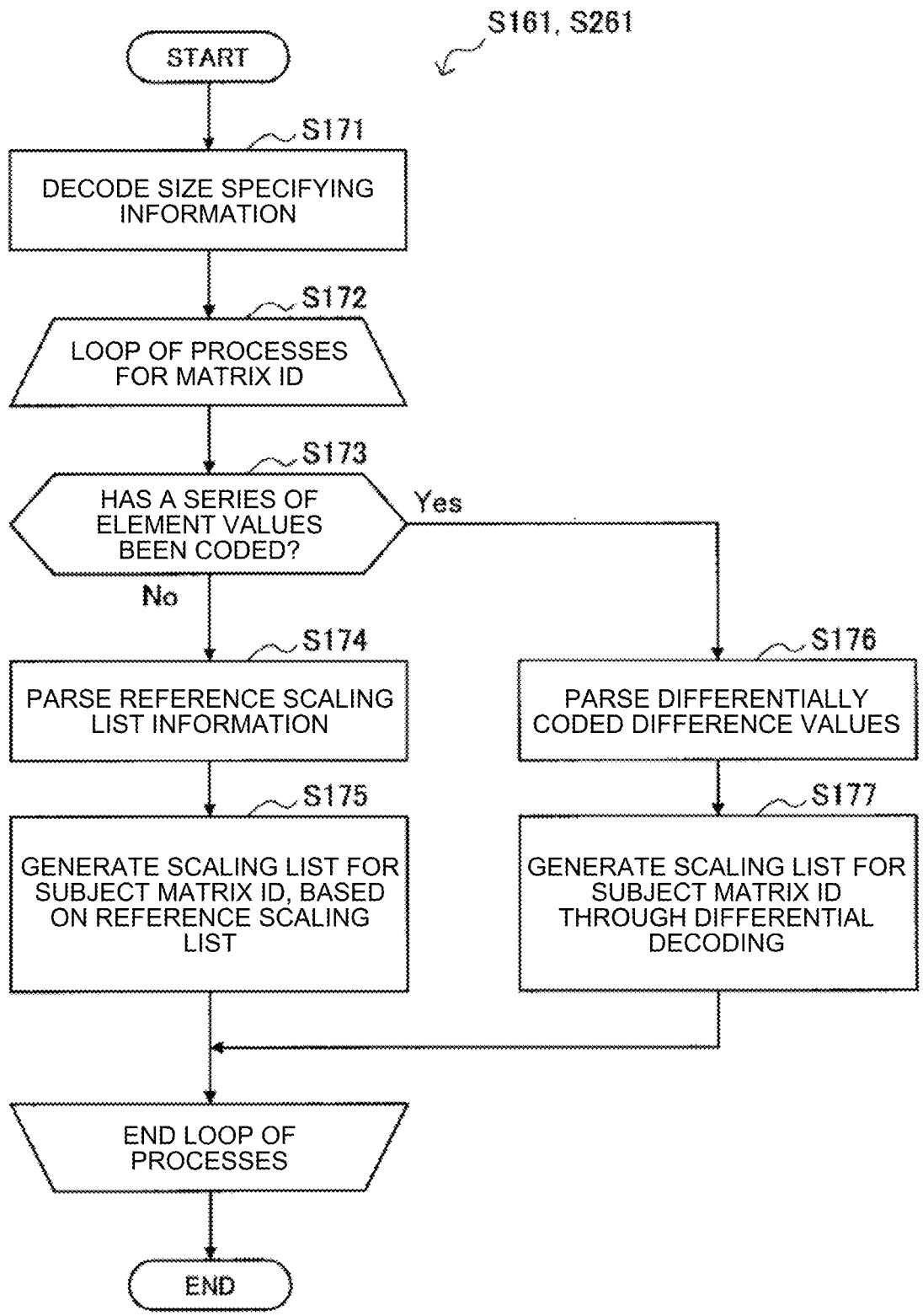
FIG. 14 is a flowchart illustrating an example of a flow of a scaling list data decoding process.

FIG. 14 is a flowchart illustrating an example of a flow of the scaling list data decoding process that can be executed at step S161 of FIG. 13.

First, the SL decoding unit 163 decodes size specifying information to set a size ID for identifying the size of a quantizing matrix corresponding to a scaling list to be generated (step S171). When basic quantizing matrices are always square matrices, one size ID is set for one size, as shown in table 3. When basic quantizing matrices include non-square matrices, however, two size IDs corresponding to two directions may be set for one size, based on the size specifying information. The size ID may be derived by adding a preset offset value to a value indicated by the size specifying information.

A series of process steps S173 to S177 to follow are repeated for each of combinations of prediction types and color components, that is, each of quantizing matrix types identified by matrix IDs (step S172). A matrix ID for which the process steps are repeated is referred to as subject matrix ID.

The SL decoding unit 163 determines whether a series of element values of a scaling list associated with the subject matrix ID are explicitly coded (step S173). For example, the SL decoding unit 163 can determine whether the series of element values are coded or only the reference scaling list information is coded, based on the size ID set at step S171 and on a control flag associated with the subject matrix ID (e.g., "scaling_list_pred_mode_flag[sizeId][matrixId]" on table 1).

When only the reference scaling list information (e.g., "scaling_list_pred_matrix_id_delta [sizeId][matrixId]" on table 1) is coded, the SL decoding unit 163 parses the reference scaling list information to derive a matrix ID for a basic quantizing matrix to be referred to (step S174). The SL decoding unit 163 then generates the scaling list for the subject matrix ID, based on a reference scaling list that is referred to using the derived matrix ID as a key (step S175).

When the series of element values of the scaling list are coded, on the other hand, the SL decoding unit 163 parses difference values of the series of element values, the difference values being differentially coded in the scaling list data (step S176). The SL decoding unit 163 then decodes those difference values by differential pulse-code modulation (DPCM) to generate the scaling list for the subject matrix ID (step S177).

The flowchart illustrated in FIG. 14 depicts an example in which the size specifying information indicating the size ID for the basic quantizing matrix is decoded. In another example, the size of the basic quantizing matrix may be predetermined based on specifications so that decoding of the size specifying information is skipped. Alternatively, size count information indicating the number of sizes to be signaled may also be decoded.

In the first embodiment described in this section, when a quantizing matrix needed for each transform block is not generated yet at the point of quantization or inverse quantization, the quantizing matrix is generated in so-called "on the fly" mode. According to such a configuration, among quantizing matrices defined by various combinations of quantizing matrices' shapes and sizes, a quantizing matrix defined by a combination of a shape and a size that is not used in actual applications is not generated. Process cost required for quantizing matrix generation, therefore, can be reduced. In addition, except for the basic quantizing matrix, only the additional quantizing matrix to be actually used needs to be stored in the memory. Thus, consumption of memory resources is reduced too.

In a second embodiment to be described in the next section, in contrast with the first embodiment, generation of an additional quantizing matrix is executed before processing on a plurality of transform blocks.

3. SECOND EMBODIMENT

[3-1. Configuration of Encoder]
(1) Overall Configuration

Figure 15:
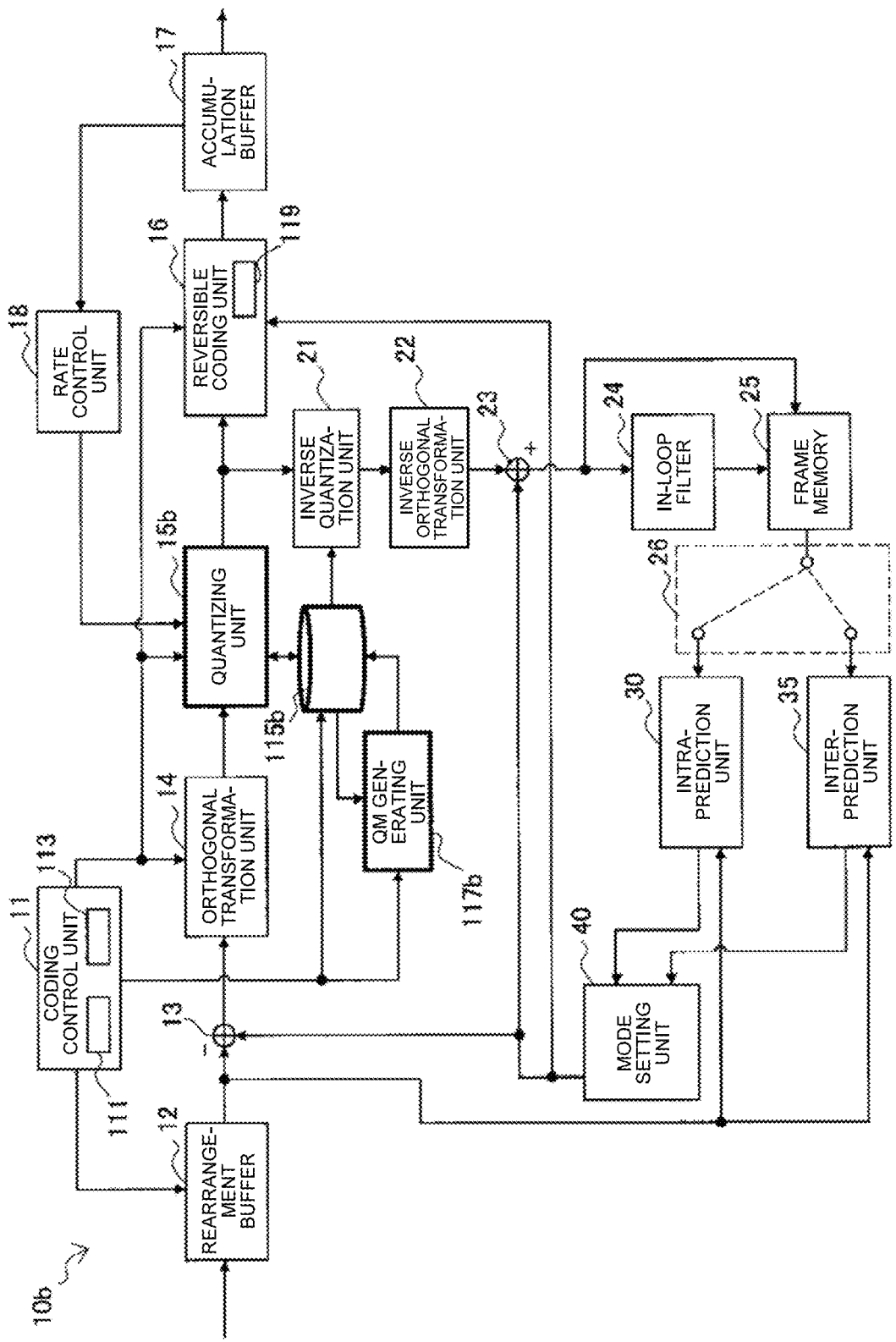
FIG. 15 is a block diagram illustrating an example of a configuration of an encoder according to a second embodiment.

FIG. 15 is a block diagram illustrating an example of a configuration of an image processing device 10b according to a second embodiment, the image processing device 10b having the functionality of the encoder. Referring to FIG. reveals that the image processing device 10b includes the coding control unit 11, the rearrangement buffer 12, the deducting unit 13, the orthogonal transformation unit 14, a quantizing unit 15b, the reversible coding unit 16, the accumulation buffer 17, the rate control unit 18, the inverse quantizing unit 21, the inverse orthogonal transformation unit 22, the adding unit 23, the in-loop filter 24, the frame memory 25, the switch 26, the intra-prediction unit 30, the inter-prediction unit 35, the mode setting unit 40, a QM memory unit 115b, and a QM generating unit 117b. The coding control unit 11 includes the block setting unit 111 and the basic QM setting unit 113, similarly to the first embodiment. The reversible coding unit 16 includes the SL coding unit 119, similarly to the first embodiment.

The quantizing unit 15b is supplied with incoming transform coefficients from the orthogonal transformation unit 14 and with a rate control signal from the rate control unit 18. For each of one or more transform blocks in an image to be coded, the quantizing unit 15b quantizes the transform coefficients, using a quantizing matrix equal in size to the transform block, to generate quantized transform coefficients (quantized data). Under control by the coding control unit 11, the quantizing unit 15b skips quantization of frequency components forcibly rendered zero that are included in the transform coefficients. The quantizing unit 15b then outputs the generated quantized data to the reversible coding unit 16 and to the inverse quantizing unit 21. The quantizing unit 15b may change a bit rate of the quantized data by switching a quantizing step, based on the rate control signal.
(2) Functionality Related to Quantizing Matrix Generation Among various components illustrated in FIG. 15, the block setting unit 111, the basic QM setting unit 113, the QM memory unit 115b, the QM generating unit 117b, and the SL coding unit 119 are mainly involved in quantizing matrix generation performed by the encoder. The functions of these components have parts different from the functions of the corresponding components according to the first embodiment. Those different parts will hereinafter be described.

The QM memory unit 115b is a memory module that stores various types of quantizing matrices having various sizes, the quantizing matrices being used by the image processing device 10b. Quantizing matrices stored in the QM memory unit 115b include basic quantizing matrices set by the basic QM setting unit 113 and additional quantizing matrices additionally generated by the QM generating unit 117b, which will be described later on. According to this embodiment, both basic quantizing matrix and additional quantizing matrix are generated prior to orthogonal transformation and quantization performed across a plurality of transform blocks, and are stored in the QM memory unit 115b through these processes of orthogonal transformation and quantization. The QM memory unit 115b may manage matrix management information that is internal control information indicating the size of the quantizing matrix present already.

Before quantization of transform coefficients of the plurality of transform blocks, the QM generating unit 117b generates an additional quantizing matrix corresponding to each of a plurality of size candidates for the transform blocks. For example, for each of size candidates for quantizing matrices that are judged to be quantizing matrices not generated yet, based on the matrix management information provided by the QM memory unit 115b, the QM generating unit 117b selects one of already generated basic quantizing matrices, as a reference quantizing matrix, and re-samples the selected reference quantizing matrix, thereby generating an additional quantizing matrix corresponding to the size candidate. The QM generating unit 117b then stores the generated additional quantizing matrix in the QM memory unit 115b. The QM generating unit 117b includes a memory that temporarily stores the reference quantizing matrix or its partial matrix to be re-sampled.

When generating an additional quantizing matrix of a size to which zeroing of high-frequency components is not applied, the QM generating unit 117b refers to the whole of the reference quantizing matrix, similarly to the QM generating unit 117a according to the first embodiment. When generating an additional quantizing matrix of a size to which zeroing of high-frequency components is applied, on the other hand, the QM generating unit 117b refers to only the partial matrix of the reference quantizing matrix. In the latter case, as described above, a ratio of the size of the partial matrix referred to, to the size of the reference quantizing matrix is equal to a ratio of the size of a non-zero part to the size of the additional quantizing matrix generated.

The descriptive contents of the examples of syntax and semantics, of the method of selecting a reference quantizing matrix, and of the method of generating an additional quantizing matrix through re-sampling (up-sampling or down-sampling), the examples having been described in detail above regarding with the first embodiment, apply also to the second embodiment.
[3-2. Flow of Quantization-Related Processes Executed at Coding]

Figure 16:
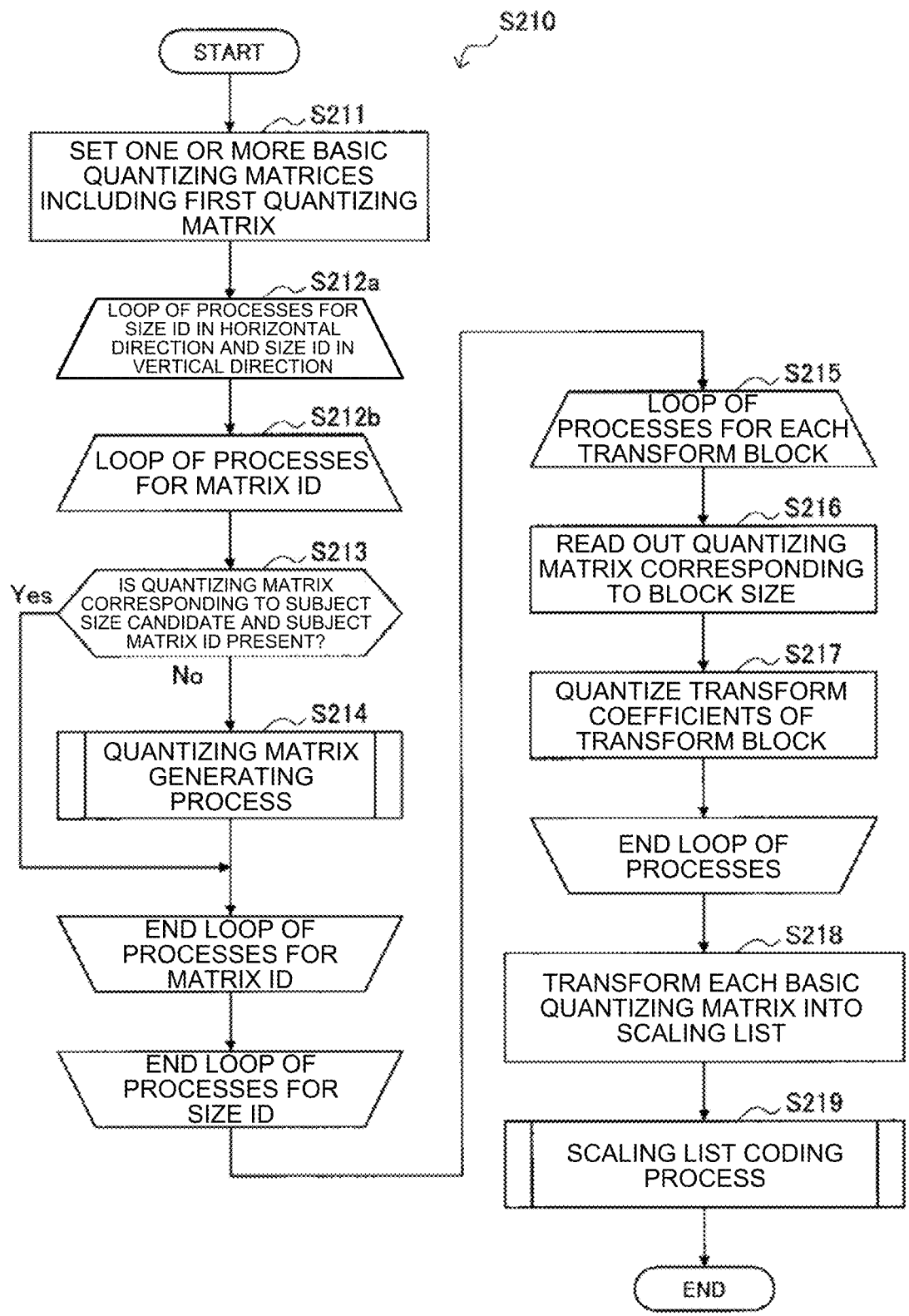
FIG. 16 is a flowchart illustrating an example of a flow of quantization-related processes executed by the encoder of FIG. 15.

FIG. 16 is a flowchart illustrating an example of a flow of quantization-related processes executed by the image processing device 10b of FIG. 15. In this flowchart, among various process steps included in a coding process, process steps not related to quantization are not described for the purpose of simpler description.

First, the basic QM setting unit 113 sets one or more basic quantizing matrices, which include a first quantizing matrix of a first size (step S211). These basic quantizing matrices are stored in the QM memory unit 115b.

Process steps S213 and S214 to follow are repeated for each of one or more size candidates, that is, for each of combinations of size IDs in the horizontal direction and size IDs in the vertical direction (step S212a). In this loop of process steps, steps S213 and S214 are repeated for each of a plurality of matrix IDs corresponding to combinations of prediction types and color components (step S212b). A size candidate and a matrix ID for which the process steps are repeated is referred to respectively as subject size candidate and subject matrix ID.

The QM generating unit 117*b* first determines whether a quantizing matrix corresponding to the subject size candidate and the subject matrix ID is present, by, for example, referring to matrix management information provided by the QM memory unit 115*b* (step S213). When such a quantizing matrix is not present, the QM generating unit 117*b* executes the quantizing matrix generating process, which has been described above referring to FIG. 10, to generate an additional quantizing matrix from a reference quantizing matrix (step S214). The additional quantizing matrix generated at this step is stored in the QM memory unit 115*b*.

When the loop of process steps for generating the additional quantizing matrix is over, process steps S216 and S217 are repeated for each of a plurality of transform blocks that are set in an image by the block setting unit 111 (step S215). Each transform block for which these process steps are repeated is referred to as subject transform block.

The quantizing unit 15*b* reads a quantizing matrix corresponding to the bock size of the subject transform block, out of the QM memory unit 115*b* (step S216). The quantizing unit 15*b* then quantizes transform coefficients of the subject transform block, using the read quantizing matrix (step S217).

The SL coding unit 119 turns each of one or more basic quantizing matrices set at step S211 into one-dimensional codes, thus transforming each of the basic quantizing matrices into a scaling list (step S218). The SL coding unit 119 then executes the scaling list coding process, which has been described above referring to FIG. 11, to generate scaling list data (step S219).

The quantized transform coefficients of each transform block, the quantized transform coefficients being generated at step S217, are coded by the reversible coding unit 16 so that the coded quantized transform coefficients, together with the scaling list data, become part of a coded stream. This process is not illustrated in FIG. 16. The scaling list data may be updated in any kind of updating unit, such as sequence, picture, slice, and tile.

[3-3. Configuration of Decoder]
(1) Overall Configuration

Figure 17:
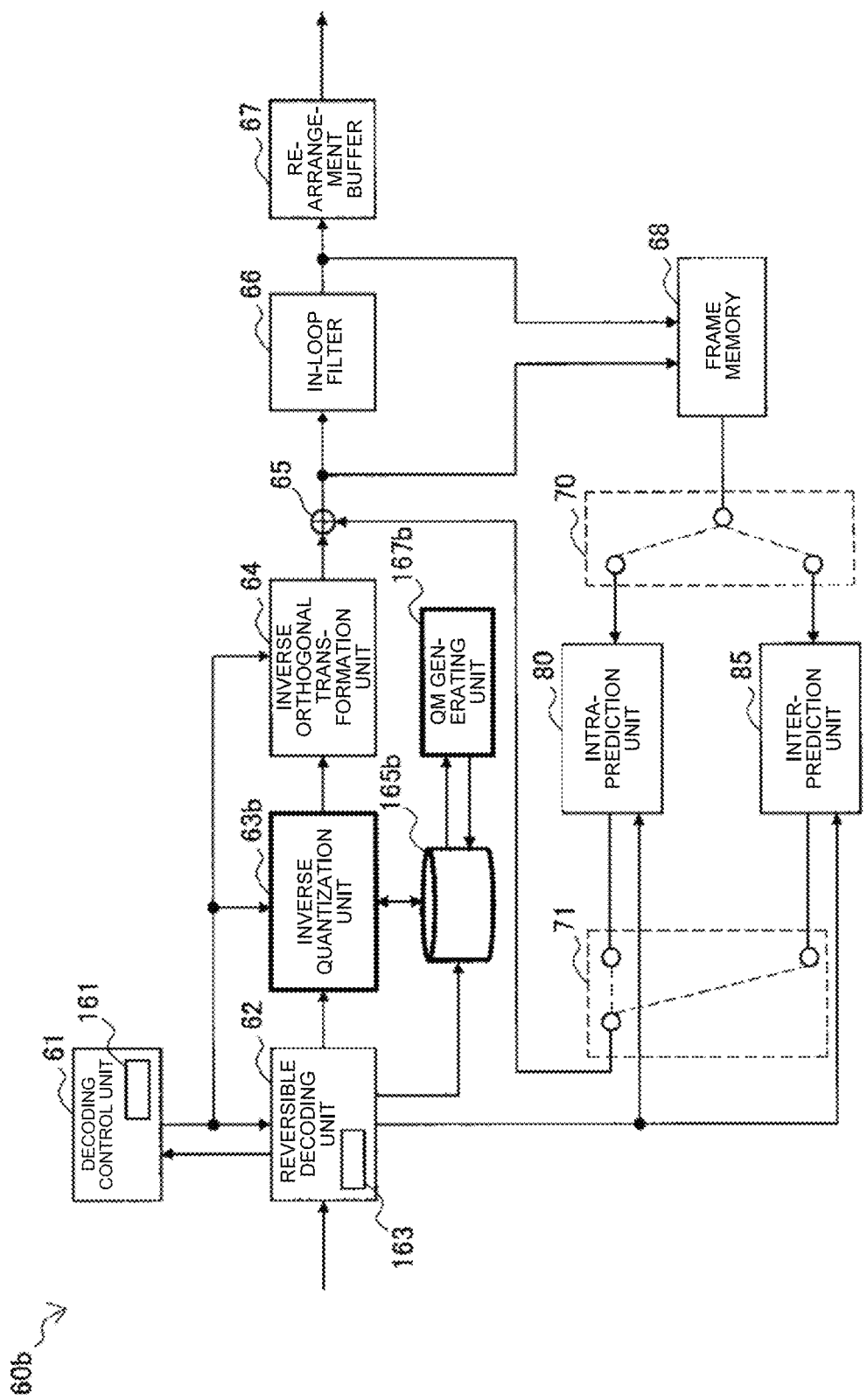
FIG. 17 is a block diagram illustrating an example of a configuration of a decoder according to the second embodiment.

FIG. 17 is a block diagram illustrating an example of a configuration of the image processing device 60*b* according to the second embodiment, the image processing device 60*b* having a functionality of the decoder. Referring to FIG. 17 reveals that the image processing device 60*b* includes the decoding control unit 61, the reversible decoding unit 62, an inverse quantizing unit 63*b*, the inverse orthogonal transformation unit 64, the adding unit 65, the in-loop filter 66, the rearrangement buffer 67, the frame memory 68, the selectors 70 and 71, the intra-prediction unit 80, the inter-prediction unit 85, a QM memory unit 165*b*, and a QM generating unit 167*b*. The decoding control unit 61 includes the block setting unit 161, similarly to the first embodiment. The reversible decoding unit 62 includes the SL decoding unit 163, similarly to the first embodiment.

For each of one or more transform blocks set in an image, the inverse quantizing unit 63*b* inversely quantizes incoming quantized data, i.e., quantized transform coefficients from the reversible decoding unit 62, to restore transform coefficients. The inverse quantizing unit 63*b* selects a quantizing matrix equal in size to a transform block out of a plurality of quantizing matrices stored in the QM memory unit 165*b* and uses the selected quantizing matrix to inversely quantize quantized transform coefficients of the transform block. Under control by the decoding control unit 61, the inverse quantizing unit 63*b* skips inverse quantization of frequency components forcibly rendered zero. The inverse quantizing unit 63*b* then outputs the restored transform coefficients to the inverse orthogonal transformation unit 64.

(2) Functionality Related to Quantizing Matrix Generation

Among various components illustrated in FIG. 17, the block setting unit 161, the SL decoding unit 163, the QM memory unit 165*b*, and the QM generating unit 167*b* are mainly involved in quantizing matrix generation performed by the decoder. The functions of these components have parts different from the functions of the corresponding components according to the first embodiment. Those different parts will hereinafter be described.

The QM memory unit 165*b* is a memory module that stores various types of quantizing matrices having various sizes, the quantizing matrices being used by the image processing device 60*b*. Quantizing matrices stored in the QM memory unit 165*b* include basic quantizing matrices generated by the SL decoding unit 163 and additional quantizing matrices additionally generated by the QM generating unit 167*b*, which will be described later on. According to this embodiment, both basic quantizing matrix and additional quantizing matrix are generated prior to inverse quantization and inverse orthogonal transformation performed across a plurality of transform blocks, and are stored in the QM memory unit 165*b* through these processes of inverse quantization and inverse orthogonal transformation. The QM memory unit 165*b* may manage matrix management information that is internal control information indicating the size of the quantizing matrix present already.

Before inverse quantization of transform coefficients of the plurality of transform blocks, the QM generating unit 167*b* generates an additional quantizing matrix corresponding to each of a plurality of size candidates for the transform blocks. For example, for each of size candidates for quantizing matrices that are judged to be quantizing matrices not generated yet, based on the matrix management information provided by the QM memory unit 165*b*, the QM generating unit 167*b* selects one of already generated basic quantizing matrices, as a reference quantizing matrix, and re-samples the selected reference quantizing matrix, thereby generating an additional quantizing matrix corresponding to the size candidate. The QM generating unit 167*b* then stores the generated additional quantizing matrix in the QM memory unit 165*b*. The QM generating unit 167*b* includes a memory that temporarily stores the reference quantizing matrix or its partial matrix to be re-sampled.

When generating an additional quantizing matrix of a size to which zeroing of high-frequency components is not applied, the QM generating unit 167*b* refers to the whole of the reference quantizing matrix, similarly to the QM generating unit 167*a* according to the first embodiment. When generating an additional quantizing matrix of a size to which zeroing of high-frequency components is applied, on the other hand, the QM generating unit 117*b* refers to only the partial matrix of the reference quantizing matrix. In the latter case, as described above, a ratio of the size of the partial matrix referred to, to the size of the reference quantizing matrix is equal to a ratio of the size of a non-zero part to the size of the additional quantizing matrix generated.

[3-4. Flow of Inverse-Quantization-Related Processes Executed at Decoding]

Figure 18:
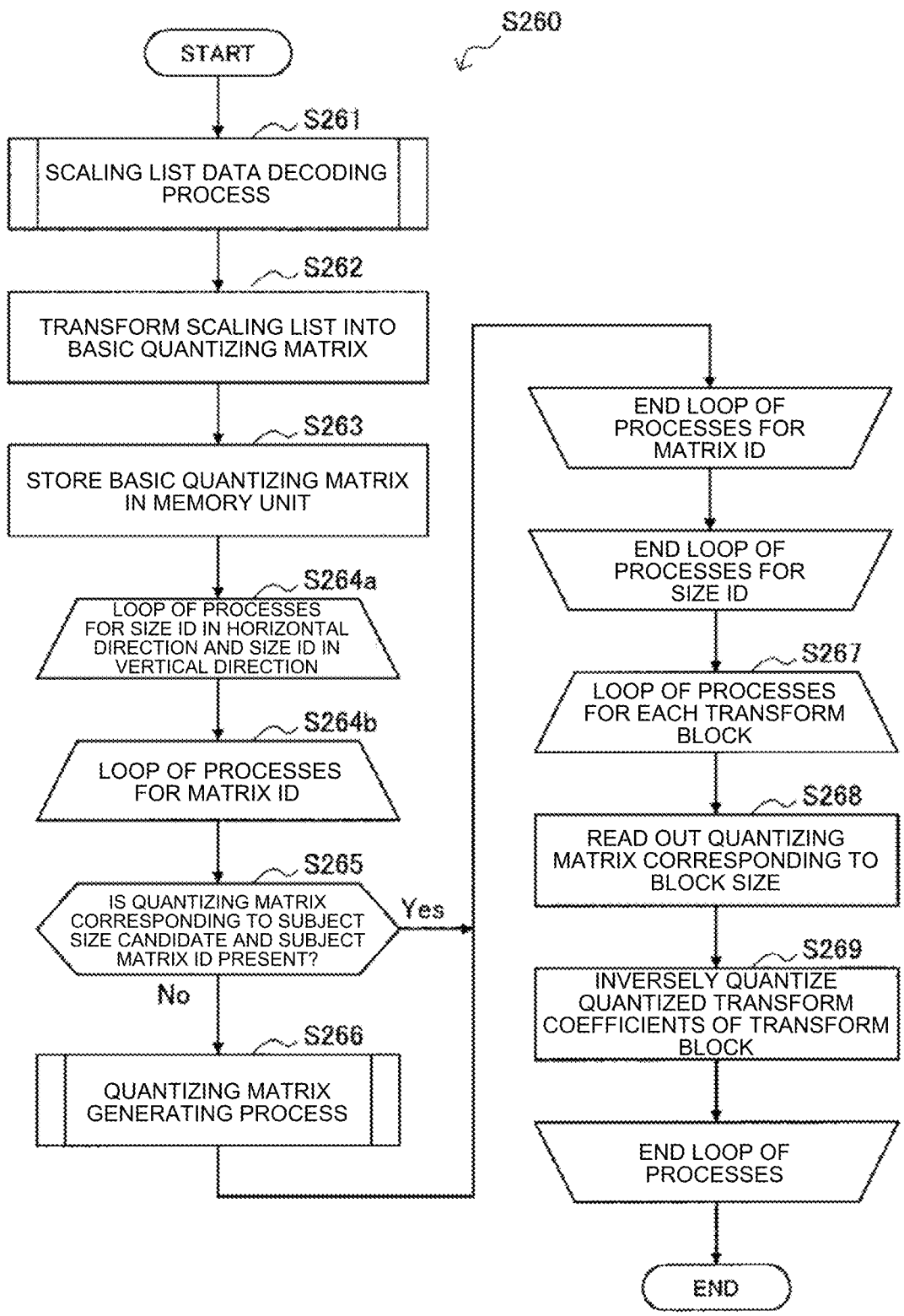
FIG. 18 is a flowchart illustrating an example of a flow of inverse-quantization-related processes executed by the decoder of FIG. 17.

FIG. 18 is a flowchart illustrating an example of a flow of inverse-quantization-related processes executed by the image processing device 60*b* of FIG. 17. In this flowchart, among various process steps included in a decoding process, process steps not related to inverse quantization are not described for the purpose of simpler description.

First, the SL decoding unit 163 executes the scaling list data decoding process, which has been described above referring to FIG. 14, to generate scaling lists expressing basic quantizing matrices of one or more sizes (step S261). Subsequently, the SL decoding unit 163 maps each scaling list, which is an array of one-dimensional element values, into a two-dimensional array of element values through a certain scan sequence, thus transforming the scaling list into a basic quantizing matrix (step S262). The QM memory unit 165b stores the basic quantizing matrix generated in this manner (step S263).

Process steps S265 and S266 to follow are repeated for each of one or more size candidates, that is, for each of combinations of size IDs in the horizontal direction and size IDs in the vertical direction (step S264a). In this loop of process steps, steps S265 and S266 are repeated for each of a plurality of matrix IDs corresponding to combinations of prediction types and color components (step S264b). A size candidate and a matrix ID for which the process steps are repeated is referred to respectively as subject size candidate and subject matrix ID.

The QM generating unit 167b first determines whether a quantizing matrix corresponding to the subject size candidate and the subject matrix ID is present, by, for example, referring to matrix management information provided by the QM memory unit 165b (step S265). When such a quantizing matrix is not present, the QM generating unit 167b executes the quantizing matrix generating process, which has been described above referring to FIG. 10, to generate an additional quantizing matrix from a reference quantizing matrix (step S266). The additional quantizing matrix generated at this step is stored in the QM memory unit 165b.

When the loop of process steps for generating the additional quantizing matrix is over, process steps S268 and S269 are repeated for each of a plurality of transform blocks that are set in an image by the block setting unit 161 (step S267). Each transform block for which these process steps are repeated is referred to as subject transform block.

The inverse quantizing unit 63b reads a quantizing matrix corresponding to the bock size of the subject transform block, out of the QM memory unit 165b (step S268). The inverse quantizing unit 63b then inversely quantizes quantized transform coefficients of the subject transform block, using the read quantizing matrix (step S269).

Transform coefficients in the frequency domain, which are generated as a result of the inverse quantization at step S269, are transformed by the inverse orthogonal transformation unit 64 into predicted errors, which represent a signal sample in the spacial domain. This process is not depicted in FIG. 18. In correspondence to updating of the scaling list data, the quantizing matrix may be updated in any kind of updating unit, such as sequence, picture, slice, and tile.

According to the second embodiment described in this section, a number of quantizing matrices that may possibly be needed for the quantization or inverse quantization process are generated in advance before execution of processing on a plurality of transform blocks. Such a configuration eliminates a need of calculations for additionally generating quantizing matrices in shortage after the start of processing for each block in the image, thus improving processing performance.

4. HARDWARE CONFIGURATION EXAMPLE

The above embodiments may be achieved using any one of these means: software, hardware, and a combination of software and hardware. When the image processing devices 10a, 10b, 60a, and 60b use software, computer programs making up the software are stored beforehand in, for example, computer-readable media (non-transitory media) incorporated in the devices or disposed outside the devices. At execution of each program, for example, the program is loaded onto a random access memory (RAM) and is executed by a processor, such as a central processing unit (CPU).

Figure 19:
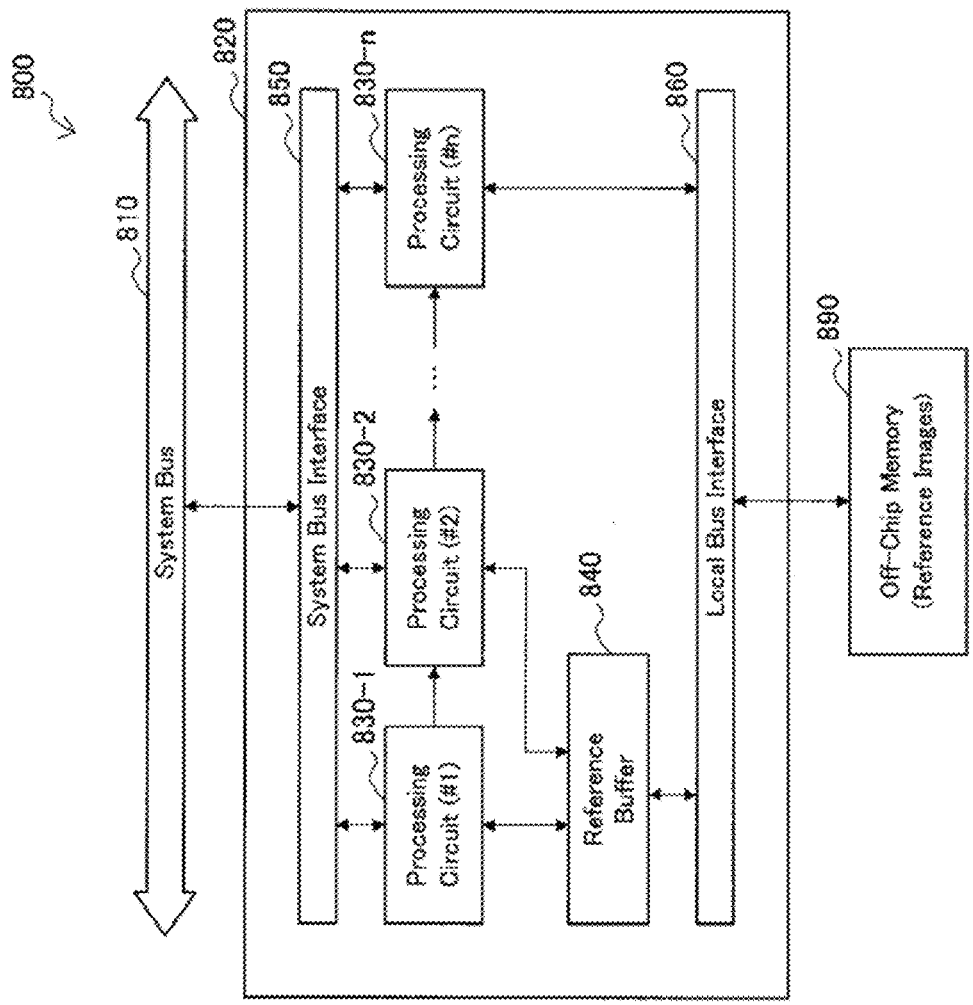
FIG. 19 is a block diagram illustrating an example of a hardware configuration.

FIG. 19 is a block diagram illustrating an example of a hardware configuration of a device to which the above embodiments can be applied. Referring to FIG. 19 reveals that a device 800 includes a system bus 810, an image processing chip 820, and an off-chip memory 890. The image processing chip 820 includes n processing circuits 830-1, 830-2, ... 830-n (n denotes an integer of 1 or larger), a reference buffer 840, a system bus interface 850, and a local bus interface 860.

The system bus 810 provides a communication path between the image processing chip 820 and an external module (e.g., a central control function, an application function, a communication interface, a user interface, or the like). The processing circuits 830-1, 830-2, ... 830-n are connected to the system bus 810 via the system bus interface 850 and to the off-chip memory 890 via the local bus interface 860. The processing circuits 830-1, 830-2, ... 830-n are also accessible to the reference buffer 840, which is equivalent to an on-chip memory (e.g., a static random-access memory (SRAM)). The on-chip memory may include, for example, the internal memory M12 illustrated in FIG. 4 or the internal memory M22 illustrated in FIG. 7. The off-chip memory 890, on the other hand, may include, for example, the QM memory M11 illustrated in FIG. 4 or the QM memory M21 illustrated in FIG. 7. The off-chip memory 890 may further include a frame memory that stores image data processed by the image processing chip 820.

5. CONCLUSION

The embodiments of the technique according to the present disclosure have been described in detail so far, referring to FIGS. 3A to 19. According to the above embodiments, when the second quantizing matrix for the transform block of the second size, to which zeroing of high-frequency components is applied, is generated, not the whole of the first quantizing matrix of the first size, which is generated by decoding the scaling list data, but only the partial matrix of the first quantizing matrix is referred to. As a result, effects on processing cost, such as occupation of hardware resources, process delays, and increasing power consumption that result from generation of various quantizing matrices can be, at east, reduced. Hence an improved system for efficiently generating or signaling quantizing matrices is provided.

According to the above embodiments, when the second size is the size to which zeroing of high-frequency components is applied, the ratio of the size of the partial matrix, which is referred to at generation of the second quantizing matrix, to the size of the first size is equal to the ratio of the size of the non-zero part to the second size. As a result, a waste of resources can be eliminated, the waste of resources resulting from calculation of a quantizing matrix's elements corresponding to transform coefficients always rendered zero.

In an embodiment, the size specifying information indicating the size of a basic quantizing matrix generated from scaling list data is coded or decoded explicitly, as a control parameter. This means that the size of the basic quantizing matrix, based on which various quantizing matrices are generated, can be indicated as a variable size, thus meaning that the user is allowed to use quantizing matrices flexibly in various intended forms. In another embodiment, scaling list data on each of one or more predetermined sizes is decoded, and the one or more sizes includes the size of the basic quantizing matrix. In this case, the necessity of coding the size specifying information is eliminated.

In an embodiment, the rule to determine the size of the transform block to which zeroing of high-frequency components is to be applied is set in advance, based on the specifications. This case does not require coding of control parameters for determining whether or not to apply zeroing of high-frequency components to a transform block. In another embodiment, the zeroing flag associated with each transform block, the zeroing flag indicating whether zeroing of high-frequency components is applied to the transform block, is coded or decoded explicitly, as a control parameter. This allows dynamically controlling application or non-application of zeroing. In another example, the zeroing size information indicating the size of the transform block to which zeroing of high-frequency components is applied is coded or decoded explicitly, as a control parameter. This allows dynamically controlling a size to which zeroing is to be applied. According to these examples, a system capable of flexibly reproducing an image expressing even minute high-frequency components is provided according to the user's needs or system requirements or constraints.

According to the above embodiments, when the second quantizing matrix is generated, the partial matrix is loaded onto the memory and is stored temporarily therein. As a result, a sufficient amount of memory resources are secured, which optimizes the device performance, such as the encoder function and decoder function.

The preferred embodiments of the present disclosure have been described above with reference to the accompanying drawings. The technical scope of the present disclosure, however, is not limited to the above embodiments. It is obvious that those who are skilled in the art in the technical field of the present disclosure can find various revisions and modifications within the scope of a technical concept described in claims, and it should be understood that these revisions and modifications will also be naturally come under the technical scope of the present disclosure.

COMBINATIONS OF EMBODIMENTS

The embodiments and various examples related thereto that have been described above may be combined in any form, and the technique according to the present disclosure is not limited to combinations directly mentioned above. For example, any given method described in relation to the first embodiment may be combined with any given method described in relation to the second embodiment.
(Subjects to which the Proposed Technique is Applied)

The technique according to the present disclosure can be applied to any given video coding method (video decoding method). In other words, specifications of processes related to coding and decoding, such as transformation (inverse transformation), quantization (inverse quantization), coding (decoding), prediction, and filtering, do not put limitations on the technical scope of the present disclosure unless such specifications clearly lead to any inconsistency. In addition, some of those processes may be omitted unless the omission clearly leads to any inconsistency.

(Block)

In general, "block" refers to any given partial area of an image (such as a picture, slice, and a tile) (In an exceptional case, this term may refer to a functional block that exerts some functionality). Unless otherwise specified, the sizes and shapes of blocks do not put limitations on the scope of the technique according to the present disclosure. For example, the concept of "block" encompasses various partial areas (process units) mentioned in the reference documents REF1 to REF3, such as a TB (transform block), TU (transform unit), PB (prediction block), PU (prediction unit), SCU (smallest coding unit), CU (coding unit), LCU (largest coding unit), CTB (coding tree block), CTU (coding tree unit), sub-block, macro block, tile, and slice.
(Data Unit/Process Unit)

Ranges to which various parameters or pieces of data or information mentioned in the present specification are applied are not limited to the ranges described in the above examples but may be ranges of any form. Likewise, ranges in which various processes mentioned in the present specification are executed are not limited to the ranges described in the above examples but may be ranges of any form. For example, those ranges may be set in units (data unit/process unit) of at least one of TB, TU, PB, PU, SCU, CU, LCU, CTB, CTU, sub-block, block, tile, slice, picture, sequence, and component. Obviously, data unit/process unit may be set for each of parameters, pieces of data and information, or processes, and may be common or not common to all of them. Parameters, data, or information may be stored in or transmitted from any given place. For example, they may be held in the header of the above unit or in a parameter set. In another case, parameters, data, or information may be dispersedly stored in or transmitted from a plurality of places.
(Control Information)

Any piece of control information related to the technique according to the present disclosure may be transmitted from the encoding side to the decoding side. For example, control information (e.g., enabled flag) that gives an instruction to enable or disable any given part of various functionalities described above may be transmitted. In another case, control information that specifies a range to which any given part of various functionalities described above can be applied (or a range to which the same cannot be applied) may be transmitted. For example, control information specifying block sizes (an upper limit block size or lower limit bock size or both of them), frames, components, or layers to which the technique according to the present disclosure is applied may be transmitted.
(Block Size Information)

A block size, which is specified in the form of control information, may not be directly expressed as a size value but may be expressed indirectly as an identifier or index that is mapped onto the size value. For example, a size value or an identifier or index corresponding to the size value may be expressed in the form of a ratio to or a difference with a certain reference value (e.g., the size of an LCU or SCU). For example, size information included in a syntax element may indirectly specify a size value according to the method described above. This approach raises a possibility that a volume of information coded, transmitted, or stored may be reduced to improve coding efficiency. Further, the above-described method of specifying a block size may be used also as a method of specifying a range of a block size.
(Others)

Generally speaking, "flag" is a piece of information identifying a plurality of states. It identifies not only the two states of "true (1)" and "false (0)" but may also identify three or more states. In other words, a flag may take, for example, either of two values: "0" and "1", or may take one of three or more values. One flag, therefore, may be composed of any number of bits, that is, could be composed of a single bit or a plurality of bits. Control information itself, which could include a flag and other identification information, may be included in a bit stream, or control information indicating a difference with some form of reference information may be included in the bit stream.

Various data and meta data on such coded data as a coded stream and a coded bit stream may be transmitted or recorded in any form if those data and meta data are associated with the coded data. The phrase " . . . data are associated with . . . data" used in this context means, for example, a case where one piece of data is made available for processing another piece of data (e.g., both pieces of data are linked or mapped to each other). In other words, pieces of data associated with each other may be handled integrally as a single piece of data or may be handled as separate pieces of data. For example, information associated with coded data (coded image) may be transmitted through a transmission path different from a transmission path through which the coded data is transmitted. In addition, information associated with coded data may be recorded on a recording medium different from a recording medium having the coded data recorded thereon (or in a different recording area of the same recording medium on which both information and coded data are recorded). Further, not data as a whole but different parts of data may be "associated with each other" in the above manner. For example, an image and information on the image may be associated with each other in any given unit, such as a plurality of frames, one frame, and a part of a frame.

It should be noted that in the present specification, such terms as "synthesizing", "multiplying", "adding", "integrating", "including", "storing", "putting in", "plugging in", and "inserting" may be used to mean a process of integrally handling separate pieces of data or a process of associating separate pieces of data with each other.

The technique according to the present disclosure may be implemented by any kind of component making up a device or system (e.g., a processor, such as a system large-scale integration (LSI), a module containing a plurality of processors, a unit containing a plurality of modules, a device set constructed by adding an extra function to a module or unit, or the like).

In the present specification, a system refers to a set of a plurality of elements (e.g., devices, units, modules, components, or the like). It should be noted, however, that all of these elements do not always need to be placed in the same enclosure. In other words, the concept of system encompasses, for example, a set of a plurality of modules housed in separate enclosures and interconnected through a network and a set of a plurality of modules housed in a single housing.

For example, a component described as a single component (e.g., processing unit) may be configured to be divided into a plurality of components. Contrary to that, a plurality of components described in the present specification may be configured to be a single component. A constituent element different from the above-described constituent elements may be added to a component described in the present specification. A part of the configuration of a certain device may be included in another device if a system as a whole substantially offers the same functionality or performs the same operation. In addition, for example, the technique according to the present disclosure may be achieved through a cloud computing technology which allows a plurality of devices interconnected through a network to exert a single or a plurality of functions cooperatively or dispersedly.

One or more steps depicted in a certain flowchart may not be executed by one device but may be executed dispersedly by a plurality of devices. A plurality of operations making up one step may not be executed by one device but may be executed dispersedly by a plurality of devices.

A program instruction making up a program run by a computer may cause the computer to execute two or more process steps described in the present specification in the order described above, or to execute the process steps through parallel processing, or to execute the process steps one by one in response to a trigger event, such as a certain event occurred or an external call made. In other words, the process steps described in the present specification may be executed in an order different from the order described above if doing so does not lead to obvious inconsistency. In addition, a process step that is to be executed based on a certain program or program instruction may be executed in parallel or simultaneously with a process step that is to be executed based on a different program or program instruction.

Effects described in the present specification are merely illustrative or exemplary one and are not restrictive one. In other words, the technique according to the present disclosure may, in addition to or in place of the above effects, offers other effects which would be obvious to those who are skilled in the art from the description of the present specification.

Note that the following configurations also come under the technical scope of the present disclosure.

(1) An image processing device comprising:
    a decoding unit that decodes scaling list data to generate a first quantizing matrix of a first size;
    a generating unit that generates a second quantizing matrix for a transform block of a second size to which zeroing of a high-frequency component is applied, by referring to only a partial matrix of the first quantizing matrix generated by the decoding unit; and
    an inverse quantizing unit that inversely quantizes a quantized transform coefficient of the transform block of the second size, using the second quantizing matrix generated by the generating unit.

(2) The image processing device according to (1), wherein a ratio of a size of the partial matrix to the first size is equal to a ratio of a size of a non-zero part to the second size.

(3) The image processing device according to (1) or (2),
    wherein the decoding unit decodes size specifying information indicating a size of a quantizing matrix generated from the scaling list data, and
    wherein the size indicated by the size specifying information includes the first size but does not include the second size.

(4) The image processing device according to (1) or (2),
    wherein the decoding unit decodes scaling list data on each of one or more predetermined sizes to generate quantizing matrices of the one or more sizes, and
    wherein the predetermined one or more sizes include the first size but do not include the second size.

(5) The image processing device according to any one of (1) to (4), wherein the generating unit generates a third quantizing matrix for a transform block of a third size to which zeroing of a high-frequency component is not applied, by referring to whole of the first quantizing matrix generated by the decoding unit.

(6) The image processing device according to any one of (1) to (5), wherein the generating unit determines whether the zeroing is applied to the transform block of the second size, according to a rule that predetermines the size of the transform block to which the zeroing is to be applied.

(7) The image processing device according to any one of (1) to (5), wherein the generating unit determines whether the zeroing is applied to the transform block of the second size, based on a zeroing flag associated with each transform block, the zeroing flag indicating whether the zeroing is applied to the transform block.

(8) The image processing device according to any one of (1) to (5), wherein the generating unit determines whether the zeroing is applied to the transform block of the second size, based on zeroing size information indicating the size of the transform block to which the zeroing is to be applied.

(9) The image processing device according to any one of (1) to (8), wherein the generating unit includes a memory that temporarily stores the partial matrix at generation of the second quantizing matrix.

(10) The image processing device according to any one of (1) to (9), further comprising
a memory unit that stores the first quantizing matrix through processing on a plurality of transform blocks,
wherein the generating unit generates the second quantizing matrix at inverse quantization of a quantized transform coefficient of each transform block of the second size.

(11) The image processing device according to any one of (1) to (9),
wherein the generating unit generates the second quantizing matrix before processing on a plurality of transform blocks, and
wherein the image processing device further comprises a memory unit that stores a plurality of quantizing matrices including the first quantizing matrix and the second quantizing matrix, through the processing on the plurality of transform blocks.

(12) The image processing device according to any one of (1) to (11), wherein the inverse quantizing unit executes an inverse quantization process on each of a plurality of transform blocks that are set in an image through quad-tree plus binary tree (QTBT) block division.

(13) An image processing method executed by an image processing device, the image processing method comprising:
decoding scaling list data to generate a first quantizing matrix of a first size;
generating a second quantizing matrix for a transform block of a second size to which zeroing of a high-frequency component is applied, by referring to only a partial matrix of the first quantizing matrix generated; and
inversely quantizing a quantized transform coefficient of the transform block of the second size, using the second quantizing matrix generated.

(14) An image processing device comprising:
a generating unit that generates a second quantizing matrix for a transform block of a second size to which zeroing of a high-frequency component is applied, by referring to only a partial matrix of a first quantizing matrix of a first size;
a quantizing unit that quantizes a transform coefficient of the transform block of the second size in an image to be coded, using the second quantizing matrix generated by the generating unit, to generate a quantized transform coefficient; and
a coding unit that codes a scaling list expressing the quantized transform coefficient and the first quantizing matrix, to generate a coded stream.

(15) An image processing method executed by an image processing device, the image processing method comprising:
generating a second quantizing matrix for a transform block of a second size to which zeroing of a high-frequency component is applied, by referring to only a partial matrix of a first quantizing matrix of a first size;
quantizing a transform coefficient of the transform block of the second size in an image to be coded, using the second quantizing matrix generated, to generate a quantized transform coefficient; and
coding a scaling list expressing the quantized transform coefficient and the first quantizing matrix, to generate a coded stream.

REFERENCE SIGNS LIST 10a, 10b IMAGE PROCESSING DEVICE (ENCODER)
15a, 15b QUANTIZING UNIT
16 REVERSIBLE CODING UNIT
111 BLOCK SETTING UNIT
113 QM SETTING UNIT
115a, 115b QM MEMORY UNIT
117a, 117b QM GENERATING UNIT
119 SL CODING UNIT
60a, 60b IMAGE PROCESSING DEVICE (DECODER)
62 REVERSIBLE DECODING UNIT
63a, 63b INVERSE QUANTIZING UNIT
161 BLOCK SETTING UNIT
163 SL DECODING UNIT
165a, 165b QM MEMORY UNIT
167a, 167b QM GENERATING UNIT

The invention claimed is:

1. An image processing device comprising:
circuitry configured to:
decode scaling list data to generate a first quantizing matrix of a first size;
generate a second quantizing matrix for a transform block of a second size, to which zeroing of a high-frequency component is applied, by referring to only a partial matrix of the first quantizing matrix generated by the circuitry, when a size of at least one direction of the second quantizing matrix is larger than an upper limit of size to which zeroing of high-frequency components is not applied; and
inversely quantize a quantized transform coefficient of the transform block of the second size, using the second quantizing matrix generated by the circuitry, wherein the second quantizing matrix is generated by resampling the first quantizing matrix.

2. The image processing device according to claim 1, wherein a ratio of a size of the partial matrix to the first size is equal to a ratio of the upper limit of size of a non-zero part to the second size.

3. The image processing device according to claim 1, wherein the circuitry is further configured to:
decode size specifying information indicating a size of a quantizing matrix generated from the scaling list data,
wherein the size indicated by the size specifying information includes the first size but does not include the second size.

4. The image processing device according to claim 1, wherein the circuitry is further configured to:
   decode scaling list data on each of one or more predetermined sizes to generate quantizing matrices of the one or more sizes,
   wherein the predetermined one or more sizes include the first size but do not include the second size.

5. The image processing device according to claim 1, wherein the circuitry is further configured to: generate a third quantizing matrix for a transform block of a third size to which zeroing of a high-frequency component is not applied, by referring to a whole of the first quantizing matrix generated by the circuitry.

6. The image processing device according to claim 1, wherein the circuitry is further configured to:
   determine whether the zeroing is applied to the transform block of the second size, according to a rule that predetermines the size of the transform block to which the zeroing is to be applied.

7. The image processing device according to claim 1, wherein the circuitry is further configured to:
   determine whether the zeroing is applied to the transform block of the second size, based on a zeroing flag associated with each transform block, the zeroing flag indicating whether the zeroing is applied to the transform block.

8. The image processing device according to claim 1, wherein the circuitry is further configured to:
   determine whether the zeroing is applied to the transform block of the second size, based on zeroing size information indicating the size of the transform block to which the zeroing is to be applied.

9. The image processing device according to claim 1, further comprising a memory that temporarily stores the partial matrix at generation of the second quantizing matrix.

10. The image processing device according to claim 1, further comprising:
    a memory that stores the first quantizing matrix through processing on a plurality of transform blocks,
    wherein the circuitry is further configured to generate the second quantizing matrix at inverse quantization of a quantized transform coefficient of each transform block of the second size.

11. The image processing device according to claim 1, wherein the circuitry is further configured to generate the second quantizing matrix before processing on a plurality of transform blocks, and
    wherein the image processing device further comprises a memory that stores a plurality of quantizing matrices including the first quantizing matrix and the second quantizing matrix, through the processing on the plurality of transform blocks.

12. The image processing device according to claim 1, wherein the circuitry is further configured to execute an inverse quantization process on each of a plurality of transform blocks that are set in an image through quad-tree plus binary tree (QTBT) block division.

13. The image processing device according to claim 1, wherein the second size is different than the first size.

14. The image processing device according to claim 1, wherein the circuitry is further configured to:
    skip an operation of calculating elements of the second quantizing matrix corresponding to zero by referring to only the partial matrix of the first quantizing matrix.

15. The image processing device according to claim 1, wherein inversely quantizing the quantized transform coefficient restores the transform coefficient, except for a portion of the transform coefficient corresponding to the high-frequency component to which zeroing is applied.

16. The image processing device according to claim 1, wherein the transform coefficient comprises a coefficient for each of a plurality of frequency components that are derived by transforming a signal sample in the spatial domain into a signal sample in the frequency domain.

17. The image processing device according to claim 1, wherein the at least one direction of the second quantizing matrix is either a horizontal direction or a vertical direction.

18. An image processing method executed by an image processing device, the image processing method comprising:
    decoding scaling list data to generate a first quantizing matrix of a first size;
    generating a second quantizing matrix for a transform block of a second size, to which zeroing of a high-frequency component is applied, by referring to only a partial matrix of the first quantizing matrix generated, when a size of at least one direction of the second quantizing matrix is larger than an upper limit of size to which zeroing of high-frequency components is not applied; and
    inversely quantizing a quantized transform coefficient of the transform block of the second size, using the second quantizing matrix generated
    wherein the second quantizing matrix is generated by resampling the first quantizing matrix.

19. An image processing device comprising:
    circuitry configured to:
    generate a second quantizing matrix for a transform block of a second size, to which zeroing of a high-frequency component is applied, by referring to only a partial matrix of a first quantizing matrix of a first size, when a size of at least one direction of the second quantizing matrix is larger than an upper limit of size to which zeroing of high-frequency components is not applied;
    quantize a transform coefficient of the transform block of the second size in an image to be coded, using the second quantizing matrix generated by the circuitry, to generate a quantized transform coefficient; and
    code a scaling list expressing the quantized transform coefficient and the first quantizing matrix, to generate a coded stream,
    wherein the second quantizing matrix is generated by resampling the first quantizing matrix.

20. An image processing method executed by an image processing device, the image processing method comprising:
    generating a second quantizing matrix for a transform block of a second size, to which zeroing of a high-frequency component is applied, by referring to only a partial matrix of a first quantizing matrix of a first size, when a size of at least one direction of the second quantizing matrix is larger than an upper limit of size to which zeroing of high-frequency components is not applied;
    quantizing a transform coefficient of the transform block of the second size in an image to be coded, using the second quantizing matrix generated, to generate a quantized transform coefficient; and
    coding a scaling list expressing the quantized transform coefficient and the first quantizing matrix, to generate a coded stream, wherein the second quantizing matrix is generated by resampling the first quantizing matrix.

* * * * *